United States Patent
He et al.

(10) Patent No.: US 11,207,776 B2
(45) Date of Patent: Dec. 28, 2021

(54) DEVICE, SYSTEM, METHOD, AND MACHINE-READABLE MEDIUM FOR CONVEYING AN INDUSTRIAL ROBOT

(71) Applicant: Siemens Ltd., China, Beijing (CN)

(72) Inventors: Jun Hu He, Zhenjiang (CN); Carlos Morra, Munich (DE)

(73) Assignee: Siemens Ltd., China, Beijing (CN)

( * ) Notice: Subject to any disclaimer, the term of this patent is extended or adjusted under 35 U.S.C. 154(b) by 179 days.

(21) Appl. No.: 16/585,732

(22) Filed: Sep. 27, 2019

(65) Prior Publication Data
US 2020/0101609 A1 Apr. 2, 2020

(30) Foreign Application Priority Data
Sep. 29, 2018 (CN) .......................... 201811151179.5

(51) Int. Cl.
*B25J 9/00* (2006.01)
*B25J 9/16* (2006.01)
(Continued)

(52) U.S. Cl.
CPC ............. *B25J 9/1664* (2013.01); *B25J 5/007* (2013.01); *B25J 9/0024* (2013.01); *B25J 9/0027* (2013.01); *B25J 9/042* (2013.01); *B25J 9/162* (2013.01)

(58) Field of Classification Search
CPC ........ B25J 9/1664; B25J 5/007; B25J 9/0024; B25J 9/0027; B25J 9/042; B25J 9/162; B62D 57/024; B62D 55/265
See application file for complete search history.

(56) References Cited

U.S. PATENT DOCUMENTS

| | | | | |
|---|---|---|---|---|
| 5,947,051 A | * | 9/1999 | Geiger | B62D 57/00 114/313 |
| 2015/0148949 A1 | * | 5/2015 | Chin | B05D 1/02 700/245 |

(Continued)

FOREIGN PATENT DOCUMENTS

| | | |
|---|---|---|
| CN | 204057075 U | 12/2014 |
| CN | 104786236 A | 7/2015 |

(Continued)

OTHER PUBLICATIONS

Extended European Search Report dated Apr. 6, 2020.
Chinese Office Action dated Nov. 2, 2020.

*Primary Examiner* — Dale Moyer
(74) *Attorney, Agent, or Firm* — Harness, Dickey & Pierce, P.L.C.

(57) ABSTRACT

A system for conveying an industrial robot includes: a control module, at least one automatic guided vehicle, and at least one electromagnetic base. An industrial robot is installed each electromagnetic base, which may attract a metallic plate fixed to the ground, thereby fixing the industrial robot installed on the electromagnetic base. An electromagnetic base is configured to, according to a first control instruction sent by the control module, stop attracting the metallic plate so that the industrial robot is movable. An automatic guided vehicle is configured to, according to a second control instruction sent by the control module, convey, to a target position, the industrial robot installed on the electromagnetic base that has stopped attracting the metallic plate. Finally, an electromagnetic base is further configured to, according to a third control instruction sent by the control module, attract the metallic plate fixed to the ground in the target position.

15 Claims, 7 Drawing Sheets

(51) Int. Cl.
*B25J 5/00* (2006.01)
*B25J 9/04* (2006.01)

(56) References Cited

U.S. PATENT DOCUMENTS

| | | |
|---|---|---|
| 2015/0273696 A1* | 10/2015 | Nam ................ B25J 19/005 700/259 |
| 2015/0316925 A1 | 11/2015 | Frisk |
| 2016/0236867 A1 | 8/2016 | Brazeau et al. |
| 2018/0056670 A1 | 3/2018 | Kerr et al. |

FOREIGN PATENT DOCUMENTS

| | | |
|---|---|---|
| CN | 107250004 A | 10/2017 |
| CN | 107803817 A | 3/2018 |
| DE | 2624378 A1 | 2/1977 |
| DE | 102007060568 A1 | 6/2009 |
| DE | 202016105302 U1 | 1/2018 |
| EP | 2939798 A1 | 11/2015 |
| EP | 3290166 A1 | 3/2018 |
| WO | WO 2016130338 A1 | 8/2016 |

\* cited by examiner

DEVICE, SYSTEM, METHOD, AND MACHINE-READABLE MEDIUM FOR CONVEYING AN INDUSTRIAL ROBOT

PRIORITY STATEMENT

The present application hereby claims priority under 35 U.S.C. § 119 to Chinese patent application number CN 201811151179.5 filed Sep. 29, 2018, the entire contents of which are hereby incorporated herein by reference.

FIELD

Embodiments of the invention generally relate to the technical field of industrial production, in particular to a device, system, method, and machine-readable medium for conveying an industrial robot.

BACKGROUND

An industrial robot is a machine device having an articulated manipulator or multiple degrees of freedom that is applicable to industrial fields, capable of performing various jobs by its own power and control ability. A plurality of adjustable industrial robots may be connected and fitted with an automatic conveying device to assemble a flexible production line. A flexible production line may be managed by a computer and combine a plurality of production modes, thereby achieving the purpose of reducing production costs.

Industrial robots included in a flexible production line are movable to restructure the flexible production line, so that various types of products may be produced.

Generally, industrial robots included in a flexible production line in a factory are fixed by bolts to the ground. When an industrial robot is to be moved, first the bolts used to fix the industrial robot are removed manually, then the industrial robot is conveyed to a target position by manually driving a crane or fork-lift truck, and finally the industrial robot is fixed again manually.

SUMMARY

Accordingly, the inventors have recognized that all the steps of conveying an industrial robot need to be completed manually, and consequently the efficiency of conveying an industrial robot is low.

In order to improve upon or even solve the aforesaid problem, a device, system, method, and machine-readable medium for conveying an industrial robot provided by the present invention can improve the efficiency of conveying an industrial robot.

In one aspect, an embodiment of the present invention provides a system for conveying an industrial robot, in which an industrial robot is installed on each electromagnetic base, and an electromagnetic base may attract a metallic plate fixed to the ground to fix the industrial robot installed on the electromagnetic base. When an industrial robot is to be conveyed, a control module may send a first control instruction to the electromagnetic base on which the industrial robot is installed; the electromagnetic base, according to the first control instruction received, stops attracting the metallic plate so that the industrial robot is movable; then, the control module sends a second control instruction to an automatic guided vehicle; the automatic guided vehicle, according to the second control instruction received, conveys, to a target position, the industrial robot and the electromagnetic base on which the industrial robot is installed; then, the control module sends a third control instruction to the electromagnetic base conveyed to the target position; and the electromagnetic base, according to the third control instruction received, attracts the metallic plate fixed to the ground in the target position, thereby fixing the industrial robot.

In a second aspect, an embodiment of the present invention further provides a robot conveying method, comprising:
    sending a first control instruction to an electromagnetic base, wherein the first control instruction is configured to instruct the electromagnetic base to stop attracting a metallic plate fixed to the ground so that the industrial robot installed on the electromagnetic base is movable;
    sending a second control instruction to an automatic guided vehicle, wherein the second control instruction is configured to instruct the automatic guided vehicle to convey, to a target position, the industrial robot installed on the electromagnetic base that has stopped attracting the metallic plate; and
    sending a third control instruction to an electromagnetic base, wherein the third control instruction is configured to instruct the electromagnetic base to attract a metallic plate fixed to the ground in the target position so that the industrial robot installed on the electromagnetic base is fixed.

In a third aspect, an embodiment of the present invention further provides another robot conveying method, comprising:
    receiving a first control instruction sent by the control module;
    instructing, according to the first control instruction, an electromagnetic attracting mechanism of an electromagnetic base on which an industrial robot is installed to stop attracting a metallic plate fixed to the ground;
    receiving a third control instruction sent by the control module; and
    instructing, according to the third control instruction, the electromagnetic attracting mechanism to attract a metallic plate fixed to the ground in a target position.

In a fourth aspect, an embodiment of the present invention further provides another robot conveying method, comprising:
    receiving a second control instruction sent by the control module; and
    instructing, according to the second control instruction, a conveying mechanism of an automatic guided vehicle to convey, to a target position, the industrial robot installed on the electromagnetic base that has stopped attracting the metallic plate.

In a fifth aspect, an embodiment of the present invention further provides a control module, comprising:
    a first instruction sending unit, configured to send a first control instruction to an electromagnetic base, wherein the first control instruction is configured to instruct the electromagnetic base to stop attracting a metallic plate fixed to the ground so that the industrial robot installed on the electromagnetic base is movable; and
    a second instruction sending unit, configured to send a second control instruction to an automatic guided vehicle, wherein the second control instruction is configured to instruct the automatic guided vehicle to convey, to a target position, the industrial robot installed on the electromagnetic base that has stopped attracting the metallic plate; and
    the first instruction sending unit is further configured to send a third control instruction to the electromagnetic base, wherein the third control instruction is configured to instruct the electromagnetic base to attract the metallic plate fixed to the ground in the target position, thereby fixing the industrial robot installed on the electromagnetic base.

In a sixth aspect, an embodiment of the present invention further provides an electromagnetic base, comprising:
a first instruction receiving module, configured to receive a first control instruction from the control module, and
an electromagnetic attracting mechanism, configured to, according to the first control instruction received by the first instruction receiving module, stop attracting a metallic plate fixed to the ground, wherein
the first instruction receiving module is further configured to receive a third control instruction from the control module, and
the electromagnetic attracting mechanism is further configured to, according to the third control instruction received by the first instruction receiving module, attract a metallic plate fixed to the ground in a target position.

In a seventh aspect, an embodiment of the present invention further provides an automatic guided vehicle, comprising:
a second instruction receiving module, configured to receive a second control instruction from the control module, and
a conveying mechanism, configured to, according to the second control instruction received by the second instruction receiving module, convey, to a target position, an industrial robot installed on an electromagnetic base that has stopped attracting a metallic plate.

In an eighth aspect, an embodiment of the present invention further provides another control module, comprising: at least one memory and at least one processor, wherein
the at least one memory is configured to store a machine-readable program, and
the at least one processor is configured to call the machine-readable program for implementing any one of the methods for conveying an industrial robot provided in the above-described second aspect.

In a ninth aspect, an embodiment of the present invention further provides another electromagnetic base, comprising: at least one memory and at least one processor, wherein
the at least one memory is configured to store a machine-readable program, and
the at least one processor is configured to call the machine-readable program for implementing any one of the methods for conveying an industrial robot provided in the above-described third aspect.

In a tenth aspect, an embodiment of the present invention further provides another automatic guided vehicle, comprising: at least one memory and at least one processor, wherein
the at least one memory is configured to store a machine-readable program, and
the at least one processor is configured to call the machine-readable program for implementing any one of the methods for conveying an industrial robot provided in the above-described fourth aspect.

In an eleventh aspect, an embodiment of the present invention further provides a machine-readable medium storing a computer instruction that, when executed by a processor, causes the processor to implement the method provided in the above-described second aspect or in any possible implementation mode of the second aspect.

LIST OF REFERENCE NUMERALS

Figure 1:
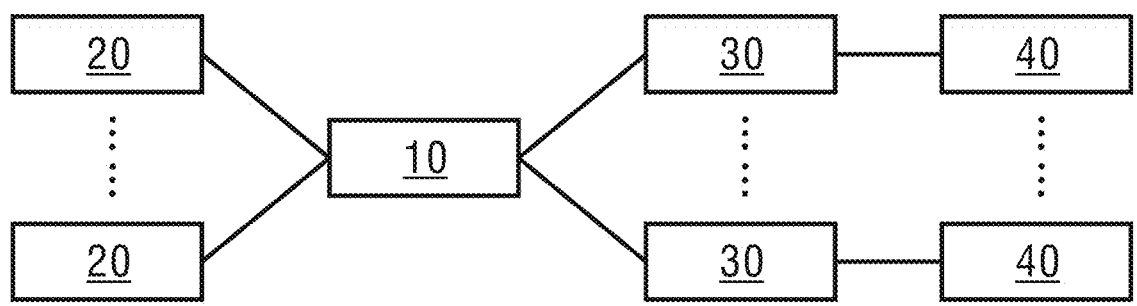
FIG. 1 is a schematic diagram for a system for conveying an industrial robot provided in an embodiment of the present invention.

| 10: Control module | 20: Automatic guided vehicle | 30: Electromagnetic base |
|---|---|---|
| 40: Industrial robot | 50: Metallic plate | 60: New production line |
| 101: First instruction sending unit | 102: Second instruction sending unit | 103: Instruction generating unit |
| 201: Vehicle frame | 202: Grab mechanism | 203: Lifting mechanism |
| 204: Wheel | 205: Second instruction receiving module | 206: Conveying mechanism |
| 207: Memory | 208: Processor | 301: Case |
| 302: Control panel | 303: Magnetic suction cup | 304: Power connector |
| 305: First instruction receiving module | 306: Electromagnetic attracting mechanism | 307: Memory |
| 308: Processor | 2011: Wheel connecting portion | 2012: Gripper connecting portion |
| 2031: Linear driver | 2032: Lifting | 20321: First |

-continued

| | component | connecting rod |
|---|---|---|
| 20322: Second connecting rod | 501: Power interface | |

601: Send a first control instruction to an electromagnetic base.
602: Send a second control instruction to an automatic guided vehicle.
603: Send a third control instruction to the electromagnetic base conveyed to the target position.
701: Receive a first control instruction sent by the control module.
702: According to the first control instruction, attract the metallic plate fixed to the ground.
703: Receive a third control instruction sent by the control module.
704: According to the third control instruction, attract the metallic plate fixed to the ground in the target position.
801: Receive a second control instruction sent by the control module.
802: According to the second control instruction, convey, to a target position, the industrial robot installed on the electromagnetic base.
901: The control module receives a conveyance instruction to convey the industrial robot.
902: The control module sends a fourth control instruction to an automatic guided vehicle.
903: The control module sends a first control instruction to the electromagnetic base on which the industrial robot is installed.
904: The control module sends a second control instruction to the automatic guided vehicle.
905: The control module sends a third control instruction to the electromagnetic base.

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element (s) or feature (s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

In one aspect, an embodiment of the present invention provides a system for conveying an industrial robot, in which an industrial robot is installed on each electromagnetic base, and an electromagnetic base may attract a metallic plate fixed to the ground to fix the industrial robot installed on the electromagnetic base. When an industrial robot is to be conveyed, a control module may send a first control instruction to the electromagnetic base on which the industrial robot is installed; the electromagnetic base, according to the first control instruction received, stops attracting the metallic plate so that the industrial robot is movable; then, the control module sends a second control instruction to an automatic guided vehicle; the automatic guided vehicle, according to the second control instruction received, conveys, to a target position, the industrial robot and the electromagnetic base on which the industrial robot is installed; then, the control module sends a third control instruction to the electromagnetic base conveyed to the target position; and the electromagnetic base, according to the third control instruction received, attracts the metallic plate fixed to the ground in the target position, thereby fixing the industrial robot.

The control module, by a control instruction, controls the movements of an electromagnetic base and an automatic guided vehicle, allowing automatic conveyance of an industrial robot. Since no on-site manual operations are required in the process of conveyance, the efficiency of conveying an industrial robot is improved.

Optionally, the control module, before sending a first control instruction to an electromagnetic base, sends a fourth control instruction to the automatic guided vehicle; the automatic guided vehicle, upon receiving the fourth control instruction, moves to the position of the industrial robot to be conveyed and grabs the industrial robot to be conveyed; this ensures that the industrial robot does not overturn when the electromagnetic base has stopped attracting the metallic plate, thereby guaranteeing safety in the conveyance of the industrial robot.

Optionally, an electromagnetic base comprises a case and a control panel and a magnetic suction cup that are disposed on the case, the case being fixedly connected to an industrial robot. The control panel is configured to receive a first control instruction from the control module and, according to the first control instruction, generate a magnetism disabling instruction; the control panel is further configured to receive a third control instruction from the control module and, according to the third control instruction, generate a magnetism enabling instruction. The magnetic suction cup is configured to, after the control panel generates a magnetism disabling instruction, stop generating electromagnetism for attracting the metallic plate, so that the industrial robot fixedly connected to the case is movable; the magnetic suction cup is further configured to, after the control panel generates a magnetism enabling instruction, start generating electromagnetism for attracting the metallic plate, so that the industrial robot fixedly connected to the case is fixed.

The control panel may, according to a control instruction from the control module, generate a magnetism disabling instruction or a magnetism enabling instruction; when a magnetism disabling instruction is generated, the magnetic suction cup stops generating electromagnetism for attracting the metallic plate, so that the industrial robot fixedly connected to the case is movable; when a magnetism enabling instruction is generated, the magnetic suction cup starts generating electromagnetism for attracting the metallic plate, so that the industrial robot fixedly connected to the case is fixed. Whether an industrial robot is fixed or unfixed is controlled by instructing the magnetic suction cup to generate or stop generating magnetism, so that the industrial robot may be fixed or unfixed without on-site manual operations. In addition, no foundation for installing an industrial robot needs to be laid on the ground in the factory, and thus the convenience of changing a position for arranging an industrial robot is improved.

Optionally, an electromagnetic base further comprises a power connector that is disposed on the case, and an output end of the power connector is connected to a power cable of the industrial robot fixedly connected to the case; when the magnetic suction cup starts generating electromagnetism for attracting a metallic plate, an input end of the power connector may be connected to a power interface disposed on the metallic plate, thereby connecting a power cable of the industrial robot.

By the disposition of a power connector on the case of an electromagnetic base, when the magnetic suction cup starts generating electromagnetism for attracting a metallic plate, the power connector may be connected to a power interface disposed on the metallic plate, thereby automatically connecting a power cable of the industrial robot. Thus, when the position in which an industrial robot is disposed has changed, without manually connecting the power cable of the industrial robot on site, the industrial robot may be conveyed while the power cable of the industrial robot is connected, so that the process of restructuring the flexible production line consisting of industrial robots becomes more convenient.

Optionally, an automatic guided vehicle comprises a vehicle frame, a grab mechanism disposed on the vehicle frame, a lifting mechanism, and at least three wheels. The grab mechanism is configured to grab an industrial robot; the lifting mechanism is configured to, after the grab mechanism grabs the industrial robot, lift the industrial robot so that the industrial robot and the electromagnetic base that is fixedly connected to the industrial robot leave the ground; and the at least three wheels are configured to, after the lifting mechanism lifts the industrial robot, drive the vehicle frame to move, thereby conveying the industrial robot to a target position.

The grab mechanism disposed on the vehicle frame may grab an industrial robot, so that the lifting mechanism may lift the industrial robot above the ground by the grab mechanism. Thus, an industrial robot being conveyed does not come into contact with the ground. On the one hand, a lower driving force is needed for an automatic guided vehicle to convey an industrial robot; on the other hand, a damage to an industrial robot due to friction or collision between the industrial robot and the ground can be prevented.

Optionally, the vehicle frame of an automatic guided vehicle comprises a wheel connecting portion and a gripper connecting portion, the lifting mechanism of an automatic guided vehicle comprises at least one linear driver and four lifting components, the at least three wheels of an automatic guided vehicle are disposed on the wheel connecting portion, and the grab mechanism is disposed on the gripper connecting portion. The four lifting components are disposed on both sides of the gripper connecting portion, two lifting components being disposed on either side, each lifting component comprising a first connecting rod and a second connecting rod, wherein a first end of the first connecting rod is connected to the wheel connecting portion by a pin roll, a first end of the second connecting rod is connected to the gripper connecting portion by a pin roll, and a second end of the first connecting rod is connected to a second end of the second connecting rod by a pin roll. The two lifting components on the same side of the gripper connecting portion are connected to both ends of one linear driver, and specifically one lifting component is connected to either end of the linear driver, respectively, wherein each end of the linear driver is connected to a second end of the first connecting rod in a lifting component and a second end of the second connecting rod by a pin roll, and the two lifting components connected to the linear driver are symmetrical with respect to the midpoint of the axial line of the linear driver.

In an automatic guided vehicle, each wheel is disposed on the wheel connecting portion, the grab mechanism is disposed on the gripper connecting portion, and the wheel connecting portion and the gripper connecting portion are connected by each lifting component; the linear driver connected to a lifting component may, by expansion and contraction movements, drive changes in the shape of the lifting component, thereby driving the gripper connecting portion to make up-and-down movements relative to the wheel connecting portion. Two lifting components are disposed on either side of the gripper connecting portion; thus, when the linear driver makes expansion and contraction movements, changing the shapes of the lifting components, the thrust force applied on the gripper connecting portion is more balanced, thereby preventing any damage to an industrial robot due to an overturn.

Optionally, in an automatic guided vehicle, a U-shaped opening is disposed in a horizontal direction on the gripper connecting portion, and the grab mechanism is disposed at the bottom of the U-shaped opening; after an industrial robot enters the U-shaped opening, the grab mechanism may grab the industrial robot, so that the industrial robot may perform synchronized movements with the gripper connecting portion.

With a U-shaped opening disposed on the gripper connecting portion and the grab mechanism disposed at the bottom of the U-shaped opening, when the grab mechanism grabs an industrial robot and the lifting mechanism lifts the industrial robot above the ground, the center of gravity of the industrial robot is close to the center of the gripper connecting portion in a horizontal direction, so that the force applied on an automatic guided vehicle is more balanced, thereby preventing any damage to the industrial robot due to an overturn of the automatic guided vehicle caused by unbalanced force applied on it.

Optionally, the control module may generate a conveyance route based on the target position to which an industrial robot is to be conveyed and generate a second control instruction that carries the conveyance route; accordingly, the automatic guided vehicle may, according to the conveyance route carried by the second control instruction, convey the industrial robot to the target position.

The control module generates a conveyance route based on the target position to which an industrial robot is to be conveyed and, by a second control instruction, sends the generated conveyance route to an automatic guided vehicle, so that the automatic guided vehicle may, according to the generated conveyance route, convey the industrial robot to the target position; this ensures the rationality and safety of the route followed by the automatic guided vehicle to convey the industrial robot.

In a second aspect, an embodiment of the present invention further provides a robot conveying method, comprising:
    sending a first control instruction to an electromagnetic base, wherein the first control instruction is configured to instruct the electromagnetic base to stop attracting a metallic plate fixed to the ground so that the industrial robot installed on the electromagnetic base is movable;
    sending a second control instruction to an automatic guided vehicle, wherein the second control instruction is configured to instruct the automatic guided vehicle to convey, to a target position, the industrial robot installed on the electromagnetic base that has stopped attracting the metallic plate; and
    sending a third control instruction to an electromagnetic base, wherein the third control instruction is configured to instruct the electromagnetic base to attract a metallic plate fixed to the ground in the target position so that the industrial robot installed on the electromagnetic base is fixed.

When an industrial robot is to be conveyed, a first control instruction is first sent to the electromagnetic base on which the industrial robot is installed, so that the electromagnetic base stops attracting the metallic plate and the industrial robot becomes movable; then, a second control instruction is sent to an automatic guided vehicle, so that the automatic guided vehicle conveys, to a target position, the industrial robot and the electromagnetic base on which the industrial robot is installed; then, a third control instruction is sent to the electromagnetic base on which the industrial robot is installed, so that the electromagnetic base on which the industrial robot is installed attracts a metallic plate fixed to the ground in the target position, thereby fixing the industrial robot. It is thus clear that the whole process from fixing an industrial robot, conveying the industrial robot, and finally to refixing the industrial robot may be completed by control instructions without performing on-site manual operations, thereby improving the efficiency of conveying an industrial robot.

Optionally, when an industrial robot is to be conveyed, before a first control instruction is sent to the electromagnetic base on which the industrial robot is installed, a fourth control instruction is sent to an automatic guided vehicle configured to convey the industrial robot, so that the automatic guided vehicle moves to the position of the industrial robot and grabs the industrial robot; this ensures that the industrial robot is not damaged due to an overturn when the electromagnetic base, according to a first control instruction, stops attracting the metallic plate, thereby guaranteeing safety in the conveyance of the industrial robot.

Optionally, when the automatic guided vehicle comprises a vehicle frame, a grab mechanism disposed on the vehicle frame, a lifting mechanism, and at least three wheels, a second control instruction is configured to instruct the grab mechanism to grab the industrial robot, instruct the lifting mechanism to lift the industrial robot so that the industrial robot and the electromagnetic base that is fixedly connected to the industrial robot leave the ground, and instruct the at least three wheels to drive the vehicle frame to move, thereby conveying the industrial robot to the target position.

The second control instruction may instruct the grab mechanism to grab the industrial robot, instruct, after the grab mechanism grabs the industrial robot, the lifting mechanism to lift the industrial robot and the electromagnetic base that is fixedly connected to the industrial robot above the ground, and then instruct the wheels to drive the vehicle frame to move, thereby conveying the industrial robot to the target position. Thus, when an automatic guided vehicle conveys an industrial robot, the industrial robot remains above the ground, and any damage to the industrial robot due to friction or collision between the industrial robot and the ground during conveyance can be prevented.

Optionally, when the vehicle frame comprises a wheel connecting portion and a gripper connecting portion and the lifting mechanism comprises at least one linear driver and four lifting components, a second control instruction is configured to instruct the at least one linear driver to make expansion and contraction movements, thereby driving changes in the angle between the first connecting rod and the second connecting rod in a lifting component so that the gripper connecting portion makes up-and-down movements relative to the wheel connecting portion.

A second control instruction may instruct the linear driver to make expansion and contraction movements so that the gripper connecting portion makes up-and-down movements relative to the wheel connecting portion, capable of lifting an industrial robot above the ground or placing an industrial robot on the ground; this ensures automation of the whole process of conveying an industrial robot by an automatic guided vehicle.

Optionally, before a second control instruction is sent to an automatic guided vehicle, a conveyance route is generated on the basis of the target position to which an industrial robot is to be conveyed, and thus a second control instruction carrying the conveyance route is generated and then sent to the automatic guided vehicle; accordingly, the automatic guided vehicle may, according to the conveyance route carried by the second control instruction, convey the industrial robot to the target position.

Since a conveyance route is generated on the basis of a target position to which an industrial robot is to be conveyed, an automatic guided vehicle may, according to the generated conveyance route, convey the industrial robot to the target position, ensuring rationality of the route followed by the automatic guided vehicle; thus, when an industrial robot is conveyed quickly, safety is guaranteed.

In a third aspect, an embodiment of the present invention further provides another robot conveying method, comprising:
- receiving a first control instruction sent by the control module;
- instructing, according to the first control instruction, an electromagnetic attracting mechanism of an electromagnetic base on which an industrial robot is installed to stop attracting a metallic plate fixed to the ground;
- receiving a third control instruction sent by the control module; and
- instructing, according to the third control instruction, the electromagnetic attracting mechanism to attract a metallic plate fixed to the ground in a target position.

The method for conveying an industrial robot is applied to an electromagnetic base. After receiving a first control instruction sent by the control module, an electromagnetic base stops attracting a metallic plate fixed to the ground so that the industrial robot installed on the electromagnetic base is movable. After the industrial robot installed on the electromagnetic base is conveyed to the target position, the electromagnetic base, upon receiving a third control instruction sent by the control module, attracts the metallic plate fixed to the ground in the target position, thereby fixing the industrial robot installed on the electromagnetic base.

In a fourth aspect, an embodiment of the present invention further provides another robot conveying method, comprising:
- receiving a second control instruction sent by the control module; and
- instructing, according to the second control instruction, a conveying mechanism of an automatic guided vehicle to convey, to a target position, the industrial robot installed on the electromagnetic base that has stopped attracting the metallic plate.

The method for conveying an industrial robot is applied to an automatic guided vehicle. After receiving a second control instruction sent by the control module, an automatic guided vehicle conveys, to a target position, the electromagnetic base, which has stopped attracting the metallic plate, and the industrial robot installed on the electromagnetic base.

In a fifth aspect, an embodiment of the present invention further provides a control module, comprising:
- a first instruction sending unit, configured to send a first control instruction to an electromagnetic base, wherein the first control instruction is configured to instruct the electromagnetic base to stop attracting a metallic plate fixed to the ground so that the industrial robot installed on the electromagnetic base is movable; and
- a second instruction sending unit, configured to send a second control instruction to an automatic guided vehicle, wherein the second control instruction is configured to instruct the automatic guided vehicle to convey, to a target position, the industrial robot installed on the electromagnetic base that has stopped attracting the metallic plate; and
- the first instruction sending unit is further configured to send a third control instruction to the electromagnetic base, wherein the third control instruction is configured to instruct the electromagnetic base to attract the metallic plate fixed to the ground in the target position, thereby fixing the industrial robot installed on the electromagnetic base.

Optionally, the second instruction sending unit is further configured to, before sending the first control instruction to the electromagnetic base, send a fourth control instruction to the automatic guided vehicle, wherein the fourth control instruction is configured to instruct the automatic guided vehicle to grab the industrial robot.

Optionally, the control module further comprises:
- an instruction generating unit, configured to generate a conveyance route based on the target position and generate the second control instruction that carries the conveyance route.

In a sixth aspect, an embodiment of the present invention further provides an electromagnetic base, comprising:
- a first instruction receiving module, configured to receive a first control instruction from the control module, and
- an electromagnetic attracting mechanism, configured to, according to the first control instruction received by the first instruction receiving module, stop attracting a metallic plate fixed to the ground, wherein
- the first instruction receiving module is further configured to receive a third control instruction from the control module, and
- the electromagnetic attracting mechanism is further configured to, according to the third control instruction received by the first instruction receiving module, attract a metallic plate fixed to the ground in a target position.

In a seventh aspect, an embodiment of the present invention further provides an automatic guided vehicle, comprising:
- a second instruction receiving module, configured to receive a second control instruction from the control module, and
- a conveying mechanism, configured to, according to the second control instruction received by the second instruction receiving module, convey, to a target position, an industrial robot installed on an electromagnetic base that has stopped attracting a metallic plate.

In an eighth aspect, an embodiment of the present invention further provides another control module, comprising: at least one memory and at least one processor, wherein
- the at least one memory is configured to store a machine-readable program, and
- the at least one processor is configured to call the machine-readable program for implementing any one of the methods for conveying an industrial robot provided in the above-described second aspect.

In a ninth aspect, an embodiment of the present invention further provides another electromagnetic base, comprising: at least one memory and at least one processor, wherein
- the at least one memory is configured to store a machine-readable program, and
- the at least one processor is configured to call the machine-readable program for implementing any one of the methods for conveying an industrial robot provided in the above-described third aspect.

In a tenth aspect, an embodiment of the present invention further provides another automatic guided vehicle, comprising: at least one memory and at least one processor, wherein
- the at least one memory is configured to store a machine-readable program, and
- the at least one processor is configured to call the machine-readable program for implementing any one of the methods for conveying an industrial robot provided in the above-described fourth aspect.

In an eleventh aspect, an embodiment of the present invention further provides a machine-readable medium storing a computer instruction that, when executed by a processor, causes the processor to implement the method provided in the above-described second aspect or in any possible implementation mode of the second aspect.

The machine-readable medium stores a computer instruction; when the computer instruction is executed by a processor, the processor implements the method for conveying an industrial robot provided in the above-described second aspect or in any possible implementation mode of the second aspect to send a first control instruction to an electromagnetic base on which the industrial robot to be conveyed is installed, causing the electromagnetic base to stop attracting the metallic plate so that the industrial robot to be conveyed is movable, then send a second control instruction to an automatic guided vehicle so that the automatic guided vehicle conveys, to a target position, the industrial robot to be conveyed, and then send a second control instruction to the electromagnetic base on which the industrial robot to be conveyed is installed, so that the electromagnetic base attracts the metallic plate fixed to the ground in the target position, thereby fixing again the industrial robot to be conveyed. The whole process of conveying an industrial robot is completed by a processor executing a computer instruction stored on a machine-readable medium to send control instructions, requiring no on-site manual operations; thus, the efficiency of conveying an industrial robot is improved.

In another aspect, an embodiment of the present invention further provides an industrial robot conveying method, comprising:

sending a first control instruction to an electromagnetic base, the first control instruction being configured to instruct the electromagnetic base to stop attracting a metallic plate fixed to a ground so that the industrial robot installed on the electromagnetic base is movable;

sending a second control instruction to an automatic guided vehicle, the second control instruction being configured to instruct the automatic guided vehicle to convey, to a target position, the industrial robot installed on the electromagnetic base that has stopped attracting the metallic plate; and sending a third control instruction to the electromagnetic base, the third control instruction being configured to instruct the electromagnetic base to attract a metallic plate fixed to the ground in the target position so that the industrial robot installed on the electromagnetic base is fixed.

In another aspect, an embodiment of the present invention further provides a robot conveying system, comprising:

a control module;
at least one automatic guided vehicle; and
at least one electromagnetic base, wherein
an industrial robot is installed on each at least one electromagnetic base, and wherein the at least one electromagnetic base may attract a metallic plate fixed to ground, thereby fixing the industrial robot installed on the at least one electromagnetic base;
the control module is configured to send a first control instruction to the at least one electromagnetic base;
the at least one electromagnetic base is configured to, according to the first control instruction received, stop attracting the metallic plate fixed to the ground so that the industrial robot installed on the at least one electromagnetic base is movable;
the control module is further configured to send a second control instruction to the at least one automatic guided vehicle;

the at least one automatic guided vehicle is configured to, according to the second control instruction received, convey, to a target position, the industrial robot installed on the at least one electromagnetic base that has stopped attracting the metallic plate;

the control module is further configured to send a third control instruction to the at least one electromagnetic base; and the at least one electromagnetic base is further configured to, according to the third control instruction received, attract the metallic plate fixed to the ground in the target position, thereby fixing the industrial robot installed on the at least one electromagnetic base.

As mentioned previously, an industrial robot arranged in a factory is generally fixed to the ground by bolts. When an industrial robot is to be moved, first the bolts used to fix the industrial robot are removed; then the industrial robot is conveyed to a target position by driving a crane or fork-lift truck, and finally the industrial robot is fixed again by bolts. Removal and installation of bolts and conveyance of an industrial robot by a crane or fork-lift truck need to be completed manually on site, and it takes workers a long time to remove and install bolts and convey an industrial robot on site. Consequently, the efficiency of conveying an industrial robot is low.

In an embodiment of the present invention, an industrial robot is installed on an electromagnetic base, and the electromagnetic base may attract a metallic plate fixed to the ground to fix the industrial robot. When an industrial robot is to be conveyed, the control module sends a first control instruction to the electromagnetic base on which the industrial robot is installed; the electromagnetic base, upon receiving the first control instruction, stops attracting the metallic plate so that the industrial robot is movable; then, the control module sends a second control instruction to an automatic guided vehicle; the automatic guided vehicle, upon receiving the second control instruction, conveys the industrial robot to a target position; then, the control module sends a third control instruction to the electromagnetic base; and the electromagnetic base, upon receiving the third control instruction, attracts the metallic plate fixed to the ground in the target position, thereby fixing the industrial robot. Thus, an industrial robot is fixed by controlling attraction of a metallic plate by an electromagnetic base and is moved by controlling movements of an automatic guided vehicle; since no on-site manual operations are required in the process of conveying an industrial robot, the efficiency of conveying an industrial robot is improved.

A system for conveying an industrial robot and a method for conveying an industrial robot provided in an embodiment of the present invention will be described in detail below with reference to the drawings.

As shown in FIG. 1, an embodiment of the present invention provides a system for conveying an industrial robot, comprising: a control module 10, at least one automatic guided vehicle 20, and at least one electromagnetic base 30, wherein an industrial robot 40 is installed on each electromagnetic base 30, and an electromagnetic base 30 may attract a metallic plate fixed to the ground to fix the industrial robot 40 installed on the electromagnetic base 30;

the control module 20 is configured to send a first control instruction to one electromagnetic base 30;

the electromagnetic base 30 is configured to, according to the first control instruction received, stop attracting the metallic plate fixed to the ground so that the industrial robot 40 installed on the electromagnetic base 30 is movable;

the control module 20 is further configured to send a second control instruction to an automatic guided vehicle 20;

the automatic guided vehicle 20 is configured to, according to the second control instruction received, convey, to a target position, the industrial robot 40 installed on the electromagnetic base 30 that has stopped attracting the metallic plate;

the control module 20 is further configured to send a third control instruction to the electromagnetic bases 30 conveyed together with the industrial robot 40 to the target position; and the electromagnetic base 30 is further configured to, according to the third control instruction received, attract the metallic plate fixed to the ground in the target position, thereby fixing the industrial robot 40 installed on the electromagnetic base 30.

In a system for conveying an industrial robot provided in an embodiment of the present invention, the industrial robot 40 may be fixedly installed on the electromagnetic base 30, and the electromagnetic base 30 may attract a metallic plate fixed to the ground, thereby fixing the industrial robot 30 installed on the electromagnetic base 30. When an industrial robot 40 is to be conveyed, the control module 10 sends a first control instruction to the electromagnetic base 30 on which the industrial robot 40 is installed, causing the electromagnetic base 30 to stop attracting the metallic plate so that the industrial robot 40 is movable; then, the control module 10 sends a second control instruction to an automatic guided vehicle 20, so that the automatic guided vehicle 20 conveys, to a target position, the industrial robot 40 and the electromagnetic base 30 on which the industrial robot 40 is installed; then, the control module 10 sends a third control instruction to the electromagnetic base 30 on which the industrial robot 40 is installed, so that the electromagnetic base 30 attracts a metallic plate fixed to the ground in the target position, thereby fixing the industrial robot 40. The control module 10, by sending control instructions to the electromagnetic base 30 and the automatic guided vehicle 20, causes the electromagnetic base 30 to automatically complete fixing or unfixing the industrial robot 40, and causes the automatic guided vehicle 20 to automatically convey the industrial robot 40 to a target position. This allows automatic conveyance of an industrial robot 40. Since no on-site manual operations are required in the process of conveying an industrial robot, the efficiency of conveying an industrial robot is improved.

Optionally, based on the system for conveying an industrial robot shown in FIG. 1, before the control module 10 sends a first control instruction to the electromagnetic base 30 on which the industrial robot 40 is installed, the control module 10 sends a fourth control instruction to the automatic guided vehicle 20, so that the automatic guided vehicle 20, upon receiving the fourth control instruction, moves to the position of the industrial robot 40 to be conveyed, and grabs the industrial robot 40 to be conveyed, thereby supporting the industrial robot 40 to be conveyed and preventing the industrial robot 40 from overturning. After the automatic guided vehicle 20 completes grabbing the industrial robot 40, the control module 10 sends a first control instruction to the electromagnetic base 30 on which the industrial robot 40 is installed, so that the electromagnetic base 30 attracts the metallic plate; then, the control module 10 sends a second control instruction to the automatic guided vehicle 20 configured to grab the industrial robot 40, so that the automatic guided vehicle 20 conveys, to a target position, the industrial robot 40 to be conveyed.

Figure 2:
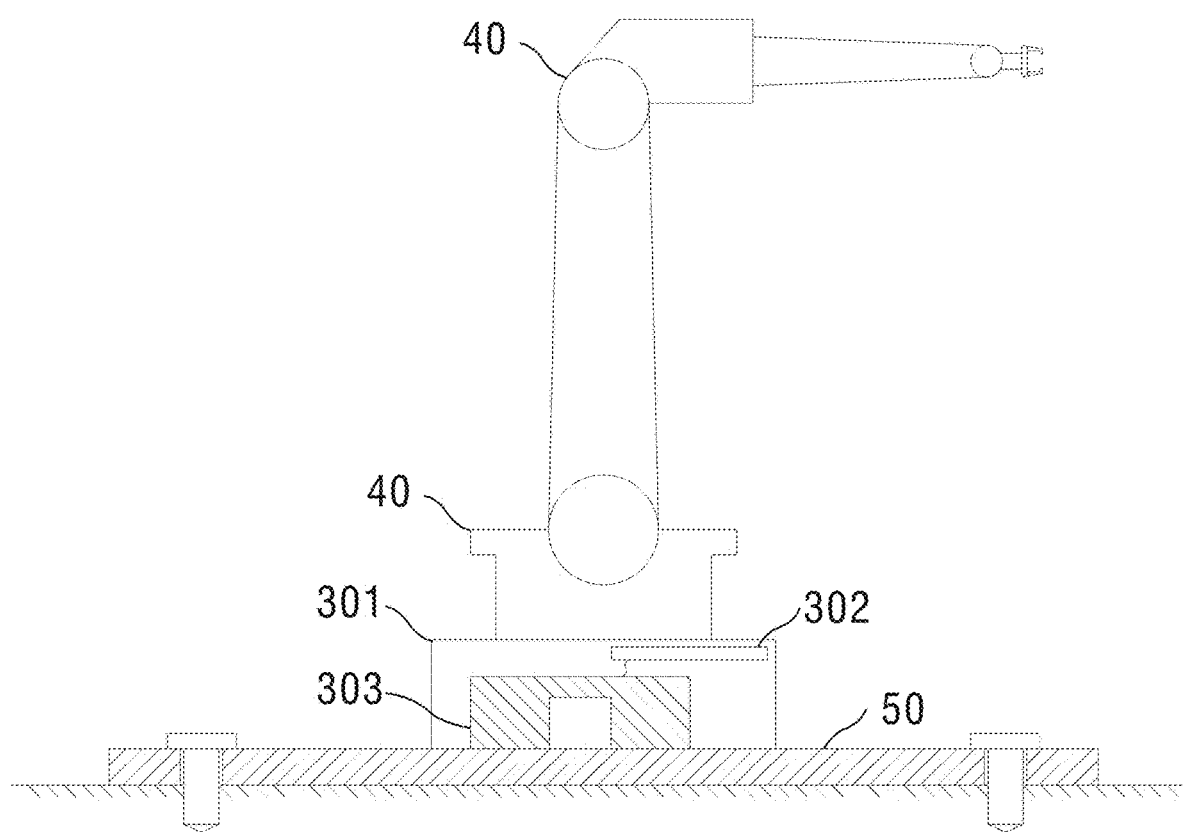
FIG. 2 is a schematic diagram for an electromagnetic base provided in an embodiment of the present invention.

Optionally, based on the system for conveying an industrial robot shown in FIG. 1, as shown in FIG. 2, the electromagnetic base 30 comprises: a case 301, and a control panel 302 and a magnetic suction cup 303 that are disposed on the case 301, wherein the case 301 is fixedly connected to an industrial robot 40;

the control panel 302 is configured to receive a first control instruction from the control module 10 and, according to the first control instruction, generate a magnetism disabling instruction; the control panel 302 is further configured to receive a third control instruction from the control module 10 and, according to the third control instruction, generate a magnetism enabling instruction;

the magnetic suction cup 303 is configured to, after the control panel 302 generates a magnetism disabling instruction, stop generating electromagnetism for attracting the metallic plate 50, so that the industrial robot 40 fixed on the case 301 is movable; the magnetic suction cup 303 is further configured to, after the control panel 302 generates a magnetism enabling instruction, start generating electromagnetism for attracting the metallic plate 50, thereby fixing the industrial robot 40 fixedly connected to the case 301.

When an industrial robot 40 is to be conveyed, first the industrial robot 40 needs to be unfixed so that the industrial robot 40 is movable; in this case, the control module 10 sends a first control instruction to the control panel 302 included by the electromagnetic base 30 that is fixedly connected to the industrial robot 40; the control panel 302, upon receiving the first control instruction, generates a magnetism disabling instruction that is capable of causing the magnetic suction cup 303 to stop generating electromagnetism for attracting the metallic plate 50. When the magnetic suction cup 303 has stopped generating electromagnetism, magnetic attraction no longer exists between the magnetic suction cup 303 and the metallic plate 50; thus, the electromagnetic base 30 and the industrial robot 40 that is fixedly connected to the electromagnetic base 30 are movable together.

After the industrial robot 40 is conveyed to a target position, the industrial robot 40 needs to be fixed; in this case, the control module 10 sends a third control instruction to the control panel 302 included by the electromagnetic base 30 that is fixedly connected to the industrial robot 40; the control panel 302, upon receiving the third control instruction, generates a magnetism enabling instruction that is capable of causing the magnetic suction cup 303 to start generating electromagnetism for attracting the metallic plate 50. After the magnetic suction cup 303 generates electromagnetism, the magnetic suction cup 303 and the metallic plate 50 are fixedly connected by magnetic attraction, while the metallic plate 50 is fixed to the ground and the magnetic suction cup 303 and the industrial robot 40 are fixed on the case 301; thus, the industrial robot 40 is fixed to the ground in the target position.

An industrial robot is fixed by magnetic attraction between a magnetic suction cup and a metallic plate, and the industrial robot may be fixed or unfixed simply by instructing the magnetic suction cup to generate or stop generating magnetism; thus, an industrial robot may be conveniently conveyed for an unlimited number of times. In addition, an industrial robot may be fixed simply by laying a metallic plate on the ground on which the industrial robot is arranged, and no foundation or embedded bolt is required; thus, the convenience of changing a position for arranging an industrial robot is further improved.

Note that a magnetism disabling instruction and a magnetism enabling instruction generated by the control panel 302 may specifically correspond to whether an input current is provided to the magnetic suction cup 303. When the control panel 302 receives a first control instruction from the control module 10, the control panel 302 starts providing an input current to the magnetic suction cup 303, so that the magnetic suction cup 303 generates electromagnetism. When the control panel 302 receives a third control instruction from the control module 10, the control panel 302 stops providing an input current to the magnetic suction cup 303, so that the magnetic suction cup 303 stops generating electromagnetism.

Figure 3:
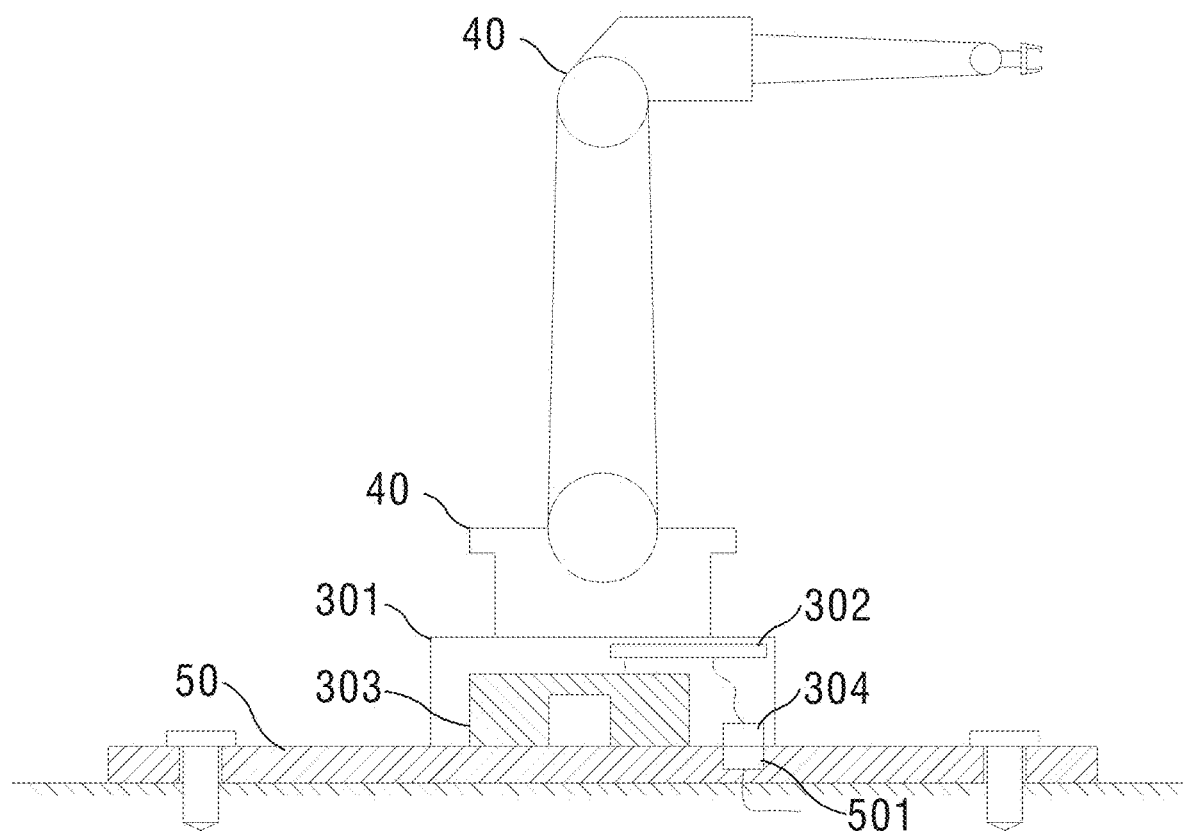
FIG. 3 is a schematic diagram for another electromagnetic base provided in an embodiment of the present invention.

Optionally, based on the electromagnetic base 30 shown in FIG. 2, as shown in FIG. 3, the electromagnetic base 30 may further comprise a power connector 304, wherein the power connector 304 is disposed on the case 301;
an output end of the power connector 304 is connected to a power cable of the industrial robot 40 fixed to the case 301; and
when the magnetic suction cup 303 starts generating electromagnetism for attracting a metallic plate 50, an input end of the power connector 304 may be connected to a power interface 501 disposed on the metallic plate 50, thereby connecting a power cable of the industrial robot 40.

For each electromagnetic base 30, the power connector 304 is disposed on the case 301 of the electromagnetic base 30, an output end of the power connector 304 is connected to a power cable of the industrial robot 40 installed on the electromagnetic base 30, an input end of the power connector 304 may be connected to the power interface 501 disposed on the metallic plate 50, and the power interface 501 is connected to a power source of the industrial robot 40. After the electromagnetic base 30, together with the industrial robot 40 connected thereto, is conveyed to a target position, the power connector 304 is aligned with the power interface 501; as the magnetic suction cup 303 generates electromagnetism for attracting the metallic plate, the power connector 304 and the power interface 501 are interconnected, thereby connecting the power cable between the industrial robot 40 and its power source.

By the disposition of the power connector 304 on the case 301, after the industrial robot 40 is conveyed to a target position and fixed, the power connector 304 may be automatically connected to the power interface 501 disposed on the metallic plate 50, thereby connecting a power cable of the industrial robot 40. Thus, upon completion of the conveyance of the industrial robot 40, the industrial robot 40 may start working according to an established procedure, and there is no need to manually connect a power cable for the industrial robot 40; this allows a flexible production line consisting of the industrial robot 40 to be restructured more conveniently.

Figure 4:
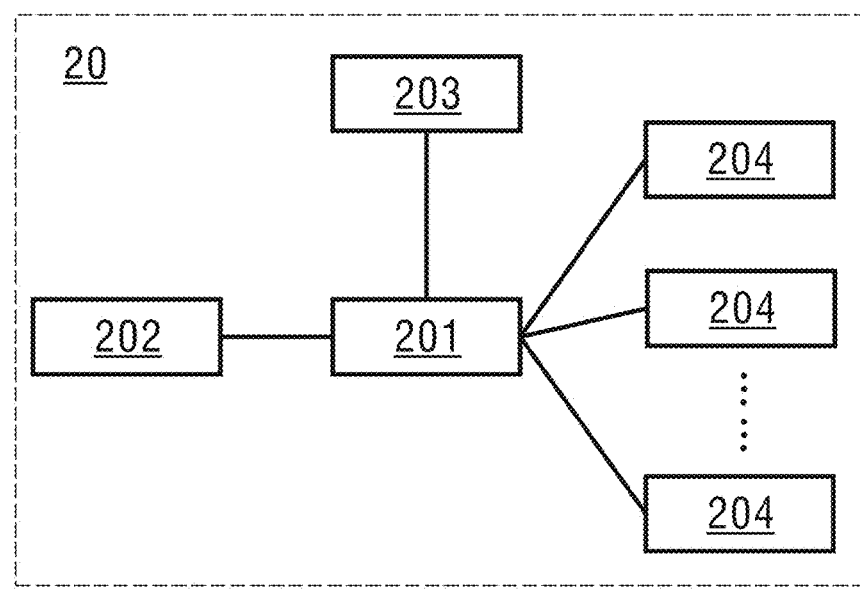
FIG. 4 is a schematic diagram for an automatic guided vehicle provided in an embodiment of the present invention.

Optionally, based on the system for conveying an industrial robot shown in FIG. 1, as shown in FIG. 4, the automatic guided vehicle 20 comprises: a vehicle frame 201, a grab mechanism 202 disposed on the vehicle frame 201, a lifting mechanism 203, and at least three wheels 204, wherein the grab mechanism 202 is configured to grab an industrial robot 40;
the lifting mechanism 203 is configured to, after the grab mechanism 202 grabs the industrial robot 40, lift the industrial robot 40 so that the industrial robot 40 and the electromagnetic base 30 that is fixedly connected to the industrial robot 40 leave the ground; and
the at least three wheels 204 are configured to, after the lifting mechanism 203 lifts the industrial robot 40, drive the vehicle frame 201 to move, thereby conveying the industrial robot 40 to a target position.

When the industrial robot 40 is to be conveyed from an original position to a target position, the control module 10 may drive an automatic guided vehicle 30 to move to the original position; when the automatic guided vehicle 30 has moved to the original position, the grab mechanism 202 grabs the industrial robot 40; then, the lifting mechanism 203 lifts the industrial robot 40 so that the industrial robot 40 and the electromagnetic base 30 that is fixedly connected to the industrial robot 40 leave the ground; then, the wheels 204 drive the vehicle frame 201 to move, thereby conveying, to the target position, the industrial robot 40 that has left the ground and the electromagnetic base 30 on which the industrial robot 40 is installed.

The lifting mechanism 203 may, after the grab mechanism 202 grabs the industrial robot 40, lift the industrial robot 40; after the lifting mechanism 203 lifts above the ground the industrial robot 40 and the electromagnetic base 30 fixedly connected to the industrial robot 40, the wheels 204 drive the vehicle frame 201 to move, thereby conveying the industrial robot 40 to the target position. When an automatic guided vehicle conveys an industrial robot, the industrial robot moves in a horizontal direction after being lifted above the ground; thus, on the one hand, resistance encountered in the process of conveying the industrial robot can be reduced; on the other hand, risks of damage to the industrial robot due to friction or collision in the process of conveyance can be reduced.

Note that the wheels 204 included by an automatic guided vehicle 20 may be Mecanum wheels; Mecanum wheels allow the automatic guided vehicle 20 to make movements including advancement, lateral movement, oblique movement, revolution, and a combination thereof, so that the automatic guided vehicle 20 may move flexibly carrying the industrial robot 40 within the factory; even in a factory with a complicated environment, the industrial robot 40 may be conveyed to a target position, and thus the applicability of the system for conveying an industrial robot is improved.

Figure 5:
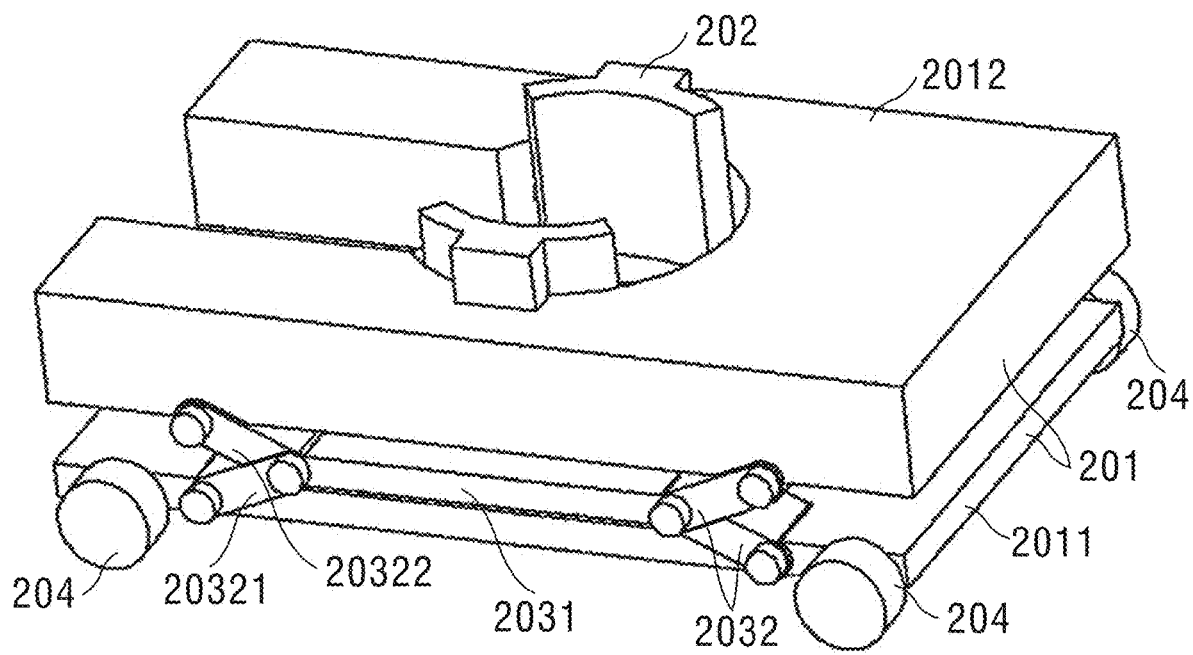
FIG. 5 is a schematic diagram for another automatic guided vehicle provided in an embodiment of the present invention.

Optionally, based on the automatic guided vehicle 20 shown in FIG. 4, as shown in FIG. 5, the vehicle frame 201 comprises a wheel connecting portion 2011 and a gripper connecting portion 2012, and the lifting mechanism 203 comprises at least one linear driver 2031 and four lifting components 2032;

at least three wheels 204 are disposed on the wheel connecting portion 2011, and the grab mechanism 202 is disposed on the gripper connecting portion 2012;
four lifting components 2032 are disposed on both sides of the gripper connecting portion 2012, two lifting components 2032 being disposed on either side;
each lifting components 2032 comprises a first connecting rod 20321 and a second connecting rod 20322, a first end of the first connecting rod 20321 being connected to the wheel connecting portion 2011 by a pin roll, a first end of the second connecting rod 20322 being connected to the gripper connecting portion 2012 by a pin roll, a second end of the first connecting rod 20321 being connected to a second end of the second connecting rod 20322 by a pin roll;
the two lifting components 2032 on the same side of the gripper connecting portion 2012 are connected to both ends of one linear driver 2031, both ends of the linear driver 2031 being respectively connected to one lifting component 2032, wherein each end of the linear driver 2031 is connected to a second end of the first connecting rod 20321 and a second end of the second connecting rod 20322 in the same lifting component 2032 by a pin roll, and the two lifting components 2032 connected to the linear driver 2031 are symmetrical with respect to the midpoint of the axial line of the linear driver 2031;

each linear driver 2031 is configured to, by expansion and contraction movements, drive changes in the angle between the first connecting rod 20321 and the second connecting rod 20322 in the lifting components 2032 connected to the linear driver, so that the gripper connecting portion 2012 makes up-and-down movements relative to the wheel connecting portion 2011.

The wheels 204 are disposed on the wheel connecting portion 2011, the grab mechanism 202 is disposed on the gripper connecting portion 2012, the wheel connecting portion 2011 and the gripper connecting portion 2012 are connected by four lifting components 2032 included by the lifting mechanism 203, and the two lifting components 2032 on the same side of the gripper connecting portion 2012 (or the wheel connecting portion 2011) are connected to one linear driver 2031 included by the lifting mechanism 203. Each linear driver 2031 may make expansion and contraction movements according to a second control instruction sent by the control module 10; expansion and contraction movements made by a linear driver 2031 may lead to changes in the angle between the first connecting rod 20321 and the second connecting rod 20322 in the two lifting components 2032 connected to the linear driver; a change in the angle between the first connecting rod 20321 and the second connecting rod 20322 that are connected by a pin roll may lead to a change in the distance between a first end of the first connecting rod 20321 and a first end of the second connecting rod 20322, while the first end of the first connecting rod 20321 is connected to the wheel connecting portion 2011, and the first end of the second connecting rod 20322 is connected to the gripper connecting portion 2012; thus, the gripper connecting portion 2012 is driven to make up-and-down movements relative to the wheel connecting portion 2011.

In an embodiment of the present invention, the lifting mechanism 203 may comprise one or more linear drivers 2031. When the lifting mechanism 203 only comprises one, three, or more linear drivers 2031, each linear driver 2031 is connected to two long pin rolls, either end of a linear driver 2031 is connected to a different long pin roll, and each long pin roll is connected to two lifting components 2032 symmetrically distributed on either side of the gripper connecting portion 2012 (or the wheel connecting portion 2011), specifically connected to a second end of the first connecting rod 20321 and a second end of the second connecting rod 20322 in the same lifting component 2032. When the lifting mechanism 203 comprises two linear drivers 2031, each linear driver 2031 is connected to the two lifting components 2032 on the same side of the gripper connecting portion 2012 (or the wheel connecting portion 2011).

Optionally, as shown in FIG. 5, a U-shaped opening is disposed in a horizontal direction on the gripper connecting portion 2012, and the grab mechanism 202 is disposed at the bottom of the U-shaped opening; after the industrial robot 40 enters the U-shaped opening, the grab mechanism 202 may grab the industrial robot 40, so that the industrial robot 40 may perform synchronized movements with the gripper connecting portion 2012.

With a U-shaped opening disposed on the gripper connecting portion 202 and the grab mechanism 202 disposed at the bottom of the U-shaped opening, when the automatic guided vehicle 20 moves until the industrial robot 40 is located at the bottom of the U-shaped opening, the grab mechanism 202 may grab the industrial robot 40. Since the grab mechanism 202 is disposed on the gripper connecting portion 2012, when the grab mechanism 202 is relatively fixed to the industrial robot 40 by grabbing the industrial robot 40, the industrial robot 40 may perform synchronized movements with the gripper connecting portion 2012, so that the industrial robot 40 is lifted when the lifting mechanism 203 drives the gripper connecting portion 2012 to rise, allowing the industrial robot 40 and the electromagnetic base 30 that is fixedly connected to the industrial robot 40 to leave the ground.

With a U-shaped opening disposed on the gripper connecting portion 202 and the grab mechanism 202 disposed at the bottom of the U-shaped opening, when the grab mechanism 202 grabs the industrial robot 40 and the lifting mechanism 20 lifts the industrial robot 40 above the ground, the center of gravity of the industrial robot 40 is close to the center of the automatic guided vehicle 20, so that the force applied on the automatic guided vehicle 20 is more balanced, thereby preventing an overturn of the automatic guided vehicle 20 caused by unbalanced force applied on it; thus, the safety of conveying an industrial robot is improved.

Optionally, based on the system for conveying an industrial robot shown in any one of FIGS. 1 to 5, the control module 10 is further configured to generate a conveyance route based on the target position to which the industrial robot 40 will be conveyed and generate a second control instruction that carries the conveyance route. Accordingly, upon receiving the second control instruction from the control module 10, the automatic guided vehicle 20 may, according to the conveyance route carried by the second control instruction, convey the industrial robot 40 to the target position.

The control module 10 has obtained in advance the original position of the industrial robot 40 and a map of the whole factory. When a user inputs a target position to which the industrial robot 40 will be conveyed, the control module 10 may, based on the original position and target position of the industrial robot 40, and the map of the whole factory, generate a conveyance route, and send a second control instruction that carries the generated conveyance route to an automatic guided vehicle 20. Upon receiving the second control instruction, the automatic guided vehicle 20 may, according to the conveyance route carried by the second control instruction, convey the industrial robot 40 from the original position and the target position. The control module 10 generates a conveyance route based on the original position and target position of the industrial robot 40, and a map of the factory, ensuring that an automatic guided vehicle 20 may convey the industrial robot 40 to the target position by following a rational route; since all obstacles are avoided while a shortest possible conveyance route is followed, the efficiency and safety of conveying an industrial robot is guaranteed.

Further, in addition to the above-described sending of a conveyance route generated by the control module 10 to an automatic guided vehicle, the control module 10 may send the original position and target position of the industrial robot 40 to the automatic guided vehicle 20; the automatic guided vehicle 20 independently works out a conveyance route based on the original position and target position of the industrial robot 40, and automatically navigates its way to the target position, thereby conveying the industrial robot 40 to the target position.

Note that in a system for conveying an industrial robot provided in any one of the above-described embodiments, before the control module 10 sends a second control instruction to an automatic guided vehicle 20, the control module 10 sends a fourth control instruction to the automatic guided vehicle 20, so that the automatic guided vehicle 20 moves to the original position of the industrial robot to be conveyed. Specifically, the control module 10 may, based on the position of the automatic guided vehicle 20 and the original position of the industrial robot to be conveyed, generate a movement route; then, the control module 10 sends a fourth control instruction that carries the generated movement route to the automatic guided vehicle 20; then, the automatic guided vehicle 20, according to the movement route carried by the fourth control instruction, moves to the original position of the industrial robot to be conveyed and conveys the industrial robot. In addition, the control module 10 may send a fourth control instruction that carries only information about the original position of the industrial robot to be conveyed to the automatic guided vehicle 20; upon receiving the fourth control instruction, the automatic guided vehicle 20, based on the information about the original position of the industrial robot to be conveyed that is carried by the fourth control instruction, automatically navigates its way to the original position of the industrial robot to be conveyed.

Note that in the system for conveying an industrial robot, the control module 10 may be disposed separately from an electromagnetic base 30 or may be disposed in an electromagnetic base 30. Specifically, when the system for conveying an industrial robot comprises a plurality of electromagnetic bases 30, the control module 10 is disposed separately from the electromagnetic bases 30 and is configured to control each of the electromagnetic bases 30; when the system for conveying an industrial robot comprises only one electromagnetic base 30, the control module 10 may be disposed in the electromagnetic base 30.

Methods for conveying an industrial robot provided by embodiments of the present invention will be described below. Unless otherwise specified, an electromagnetic base involved in a method for conveying an industrial robot described below may be the above-described electromagnetic base 30, an automatic guided vehicle involved in a method for conveying an industrial robot described below may be the above-described automatic guided vehicle 20, and an industrial robot involved in a method for conveying an industrial robot described below may be the above-described industrial robot 40.

Figure 6:
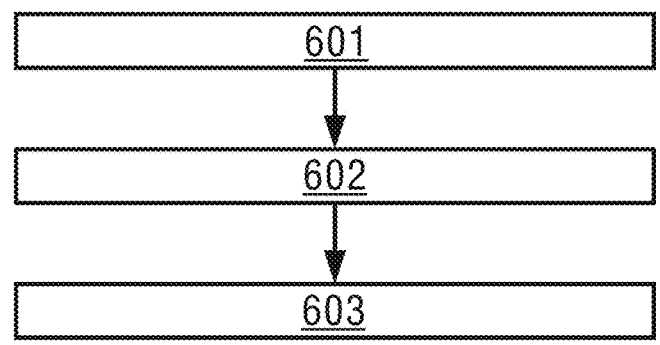
FIG. 6 is a flowchart for a method for conveying an industrial robot provided in an embodiment of the present invention.

An embodiment of the present invention provides a method for conveying an industrial robot, in which control instructions are sent to an electromagnetic base and an automatic guided vehicle so that the electromagnetic base unfixes an industrial robot, then the automatic guided vehicle conveys, to a target position, the industrial robot and the electromagnetic base on which the industrial robot is installed, and finally the electromagnetic base again fixes the industrial robot. As shown in FIG. 6, the method specifically may comprise the following steps:

Step 601: Send a first control instruction to an electromagnetic base, wherein the first control instruction is configured to instruct the electromagnetic base to stop attracting a metallic plate fixed to the ground so that the industrial robot installed on the electromagnetic base is movable;

Step 602: Send a second control instruction to an automatic guided vehicle, wherein the second control instruction is configured to instruct the automatic guided vehicle to convey, to a target position, the industrial robot installed on the electromagnetic base that has stopped attracting the metallic plate; and Step 603: Send a third control instruction to the electromagnetic base conveyed to the target position, wherein the third control instruction is configured to instruct the electromagnetic base to attract a metallic plate fixed to the ground in the target position so that the industrial robot installed on the electromagnetic base is fixed.

With a method for conveying an industrial robot provided by an embodiment of the present invention, when an industrial robot is to be conveyed, a first control instruction is first sent to the electromagnetic base on which the industrial robot is installed, so that the electromagnetic base, upon receiving the first control instruction, stops attracting the metallic plate fixed to the ground and the industrial robot becomes movable; then, a second control instruction is sent to an automatic guided vehicle, so that the automatic guided vehicle, upon receiving the second control instruction, conveys, to a target position, the industrial robot and the electromagnetic base on which the industrial robot is installed; and then a third control instruction is sent to the electromagnetic base conveyed to the target position, so that the electromagnetic base, upon receiving the third control instruction, attracts a metallic plate fixed to the ground in the target position, thereby fixing the industrial robot. It is thus clear that a first control instruction is sent to an electromagnetic base so that the electromagnetic base unfixes an industrial robot, a second control instruction is sent to an automatic guided vehicle so that the automatic guided vehicle conveys the unfixed industrial robot to a target position, and a third control instruction is sent to an electromagnetic base so that the electromagnetic base fixes the industrial robot conveyed to the target position; since no on-site manual operations are required in the process of conveying an industrial robot, the efficiency of conveying an industrial robot is improved.

Optionally, the method for conveying an industrial robot shown in FIG. 6, before Step 601, further comprises:

sending a fourth control instruction to an automatic guided vehicle, wherein the fourth control instruction is configured to instruct the automatic guided vehicle to grab the industrial robot installed on the electromagnetic base, and a fourth control instruction and a second control instruction are sent to the same automatic guided vehicle.

When an industrial robot is to be conveyed, before a first control instruction is sent to the electromagnetic base on which the industrial robot is installed, a fourth control instruction is sent to an automatic guided vehicle, so that the automatic guided vehicle moves to the position of the industrial robot and grabs the industrial robot; this ensures that the industrial robot is not damaged due to an overturn when the electromagnetic base stops attracting the metallic plate, thereby guaranteeing safety in the conveyance of the industrial robot.

Optionally, based on the method for conveying an industrial robot shown in FIG. 6, when an automatic guided vehicle, as shown in FIG. 4, comprises a vehicle frame 201, a grab mechanism 202 disposed on the vehicle frame 201, a lifting mechanism 203, and at least three wheels 204, a second control instruction is configured to control the grab mechanism 202, the lifting mechanism 203, and the wheels 204; specifically, first, a second control instruction is configured to instruct the grab mechanism 202 to grab an industrial robot; second, a second control instruction is configured to instruct the lifting mechanism 203 to lift an industrial robot so that the industrial robot and the electromagnetic base that is fixedly connected to the industrial robot leave the ground; last, a second control instruction is configured to instruct the wheels 204 to drive the vehicle frame 201 to move, thereby conveying the industrial robot to the target position.

After a second control instruction is sent to an automatic guided vehicle, the second control instruction instructs, in turn, the grab mechanism 202, the lifting mechanism 203, and the wheels 204 to perform actions, so that after the grab mechanism 202 grabs an industrial robot, the lifting mechanism 203 lifts the industrial robot above the ground, and then the wheels 204 drive the vehicle frame 201 to move, thereby conveying the industrial robot to the target position.

Optionally, based on the configuration of a second control instruction to instruct the lifting mechanism 203 to lift an industrial robot in the above-described embodiment, when, in an automatic guided vehicle as shown in FIG. 5, the vehicle frame 201 comprises a wheel connecting portion 2011 and a gripper connecting portion 2012, and the lifting mechanism 203 comprises at least one linear driver 2031 and four lifting components 2032, a second control instruction is configured to instruct each linear driver 2031 to make expansion and contraction movements, thereby driving changes in the angle between the first connecting rod 20321 and the second connecting rod 20322 in a lifting component 2032 so that the gripper connecting portion 2012 makes up-and-down movements relative to the wheel connecting portion 2011.

After a second control instruction instructs the grab mechanism 202 to grab an industrial robot, the second control instruction instructs each linear driver 2031 to make expansion and contraction movements synchronously; when making expansion and contraction movements, the linear driver 2031 may drive the first connecting rod 20321 and the second connecting rod 20322 connected to the linear driver to move, causing changes in the angle between the first connecting rod 20321 and the second connecting rod 20322; thus, the gripper connecting portion 2012 is driven to make up-and-down movements relative to the wheel connecting portion 2011, thereby lifting the industrial robot.

Optionally, the method for conveying an industrial robot shown in FIG. 6, before Step 601, further comprises: generating a conveyance route based on the target position to which an industrial robot is to be conveyed, and thus generating a second control instruction that carries the conveyance route. Accordingly, after a second control instruction is sent to an automatic guided vehicle, the automatic guided vehicle may, according to the conveyance route carried by the second control instruction, convey the industrial robot to the target position.

A conveyance route is generated on the basis of the target position to which an industrial robot is to be conveyed, and a second control instruction carrying the generated conveyance route is sent to an automatic guided vehicle, so that the automatic guided vehicle may, according to the conveyance route carried by the second control instruction, convey the industrial robot to the target position; this ensures the rationality and safety of the route followed by the automatic guided vehicle to convey the industrial robot.

Note that a method for conveying an industrial robot provided in any one of the above-described embodiments may be implemented by the control module 10 in the above-described system for conveying an industrial robot, or may be implemented by any other device that is capable of data processing and instruction transmission, for example, a smartphone, an industrial robot, a personal computer, or a distributed server.

Another method for conveying an industrial robot provided in an embodiment of the present invention will be described below. Unless otherwise specified, a control module involved in a method for conveying an industrial robot described below may be the above-described control module 10.

Figure 7:
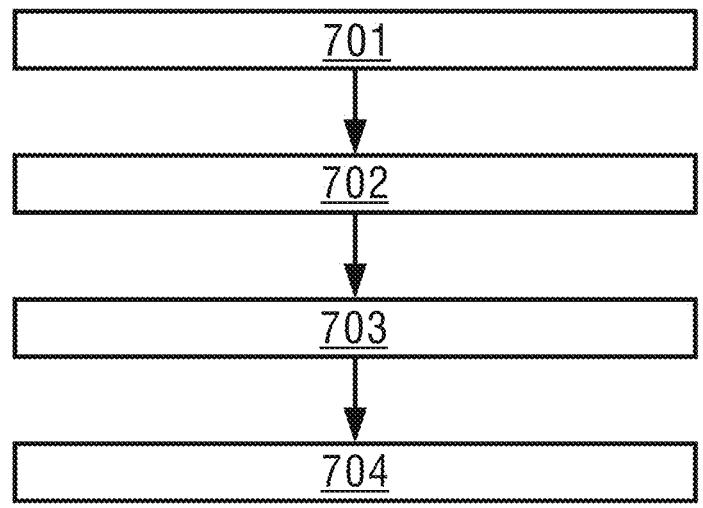
FIG. 7 is a flowchart for another method for conveying an industrial robot provided in an embodiment of the present invention.

With a method for conveying an industrial robot provided by an embodiment of the present invention, after a first control instruction is received from the control module, attraction of a metallic plate fixed to the ground is stopped according to the first control instruction, so that the industrial robot is movable. After the industrial robot is conveyed to the target position and a third control instruction is received from the control module, the metallic plate fixed to the ground in the target position is attracted according to the third control instruction, thereby fixing the industrial robot. As shown in FIG. 7, the method specifically may comprise the following steps:

Step 701: Receive a first control instruction sent by the control module;

Step 702: Instruct, according to the first control instruction, an electromagnetic attracting mechanism of an electromagnetic base on which an industrial robot is installed to stop attracting a metallic plate fixed to the ground;

Step 703: Receive a third control instruction sent by the control module; and

Step 704: Instruct, according to the third control instruction, the electromagnetic attracting mechanism to attract a metallic plate fixed to the ground in a target position.

With a method for conveying an industrial robot provided by an embodiment of the present invention, according to a first control instruction and a third control instruction sent by the control module, attraction of a metallic plate fixed to the ground may be stopped or started to unfix or fix an industrial robot; thus, there is no need to manually fix or unfix an industrial robot on site in the process of conveying the industrial robot, and the efficiency of conveying the industrial robot is improved.

Note that a method for conveying an industrial robot provided by an embodiment of the present invention may be applied to the above-described electromagnetic base 30. For details about the method, refer to the preceding description of the method for conveying an industrial robot as shown in FIG. 6, and no similar description will be provided again.

Yet another method for conveying an industrial robot provided in an embodiment of the present invention will be described below. Unless otherwise specified, a control module involved in a method for conveying an industrial robot described below may be the above-described control module 10, and an electromagnetic base involved in a method for conveying an industrial robot described below may be the above-described electromagnetic base 30.

Figure 8:
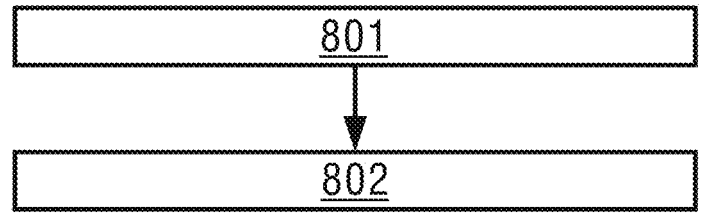
FIG. 8 is a flowchart for yet another method for conveying an industrial robot provided in an embodiment of the present invention.

With a method for conveying an industrial robot provided by an embodiment of the present invention, after a second control instruction is received from the control module, according to the second control instruction, the electromagnetic base, which has stopped attracting the metallic plate, and the industrial robot installed on the electromagnetic base are conveyed to a target position. As shown in FIG. 8, the method specifically may comprise the following steps:

Step 801: Receive a second control instruction sent by the control module; and

Step 802: Instruct, according to the second control instruction, a conveying mechanism of an automatic guided vehicle to convey, to a target position, the industrial robot installed on the electromagnetic base that has stopped attracting the metallic plate.

With a method for conveying an industrial robot provided by an embodiment of the present invention, after a second control instruction is received from the control module, the electromagnetic base, which has stopped attracting the metallic plate, and the industrial robot installed on the electromagnetic base are conveyed to the target position, so that conveyance of the industrial robot is completed after the electromagnetic base fixes the industrial robot again; thus, according to a second control instruction, an electromagnetic base and an industrial robot are automatically conveyed to the target position, without the need of conveying the industrial robot by manually driving a crane or fork-lift truck on site, and so the efficiency of conveying an industrial robot is improved.

Note that a method for conveying an industrial robot provided by an embodiment of the present invention may be applied to the above-described automatic guided vehicle 20. For details about the method, refer to the preceding description of an embodiment of the method for conveying an industrial robot as shown in FIG. 6, and no similar description will be provided again.

Figure 9:
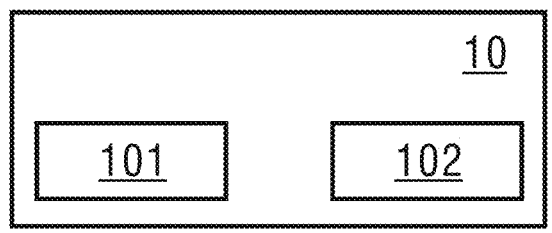
FIG. 9 is a schematic diagram for a control module provided in an embodiment of the present invention.

As shown in FIG. 9, an embodiment of the present invention provides a control module 10, comprising:

a first instruction sending unit 101, configured to send a first control instruction to an electromagnetic base 30, wherein the first control instruction is configured to instruct the electromagnetic base 30 to stop attracting a metallic plate fixed to the ground so that the industrial robot 40 installed on the electromagnetic base 30 is movable; and a second instruction sending unit 102, configured to send a second control instruction to an automatic guided vehicle 20, wherein the second control instruction is configured to instruct the automatic guided vehicle 20 to convey, to a target position, the industrial robot 40 installed on the electromagnetic base 30 that has stopped attracting the metallic plate;

the first instruction sending unit 101 is further configured to send a third control instruction to an electromagnetic base 30, wherein the third control instruction is configured to instruct the electromagnetic base 30 to stop attracting a metallic plate fixed to the ground in the target position so that the industrial robot 40 installed on the electromagnetic base 30 is fixed.

In an embodiment of the present invention, the first instruction sending unit 101 may be configured to perform Steps 601 and 603 in the above-described embodiment of the method, and the second instruction sending unit 102 may be configured to perform Step 602 in the above-described embodiment of the method.

Optionally, based on the control module 10 shown in FIG. 9, the second instruction sending unit 102 is further configured to, before sending a first control instruction to the electromagnetic base 30, send a fourth control instruction to the automatic guided vehicle 20, wherein the fourth control instruction is configured to instruct the automatic guided vehicle 20 to grab the industrial robot 40.

Figure 10:
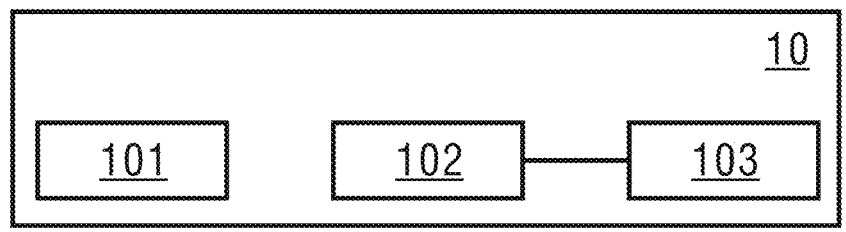
FIG. 10 is a schematic diagram for another control module provided in an embodiment of the present invention.

Optionally, based on the control module 10 shown in FIG. 9, as shown in FIG. 10, the control module 10 further comprises:

an instruction generating unit 103, configured to generate a conveyance route based on a target position and generate a second control instruction that carries the conveyance route.

Note that in the control module 10 provided by an embodiment of the present invention, each unit may send a control instruction to an electromagnetic base 30 and an automatic guided vehicle 20, instructing the electromagnetic base 30 and the automatic guided vehicle 20 to convey the industrial robot 40. For details about the process, refer to the preceding description of an embodiment of the method for conveying an industrial robot as shown in FIG. 6, and no similar description will be provided again.

Figure 11:
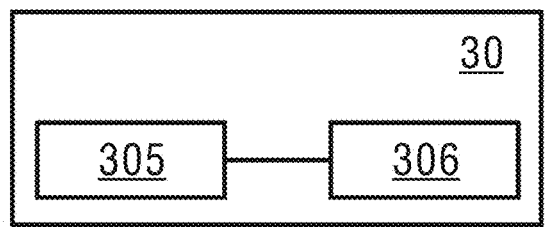
FIG. 11 is a schematic diagram for yet another electromagnetic base provided in an embodiment of the present invention.

As shown in FIG. 11, an embodiment of the present invention provides an electromagnetic base 30, comprising:

a first instruction receiving module 305, configured to receive a first control instruction from the control module 10, and an electromagnetic attracting mechanism 306, configured to, according to the first control instruction received by the first instruction receiving module 305, stop attracting a metallic plate fixed to the ground, wherein a first instruction receiving module 305 is further configured to receive a third control instruction from the control module 10, and the electromagnetic attracting mechanism 306 is further configured to, according to the third control instruction received by the first instruction receiving module 305, attract a metallic plate fixed to the ground in a target position.

In an embodiment of the present invention, the first instruction receiving module 305 may be configured to perform Steps 701 and 703 in the above-described embodiment of the method, and the electromagnetic attracting mechanism 306 may be configured to perform Steps 702 and 704 in the above-described embodiment of the method.

With an electromagnetic base 30 provided by an embodiment of the present invention, the first instruction receiving module 305 is configured to receive a first control instruction from the control module 10; the electromagnetic attracting mechanism 306 may, according to the first control instruction received by the first instruction receiving module 305, stop attracting a metallic plate fixed to the ground so that the industrial robot 40 becomes movable; the first instruction receiving module 305 is further configured to receive a third control instruction from the control module 10; the electromagnetic attracting mechanism 306 is further configured to, according to a third control instruction received by the first instruction receiving module 305, attract a metallic plate fixed to the ground in a target position, thereby automatically unfixing and fixing the industrial robot 40; there is no need to manually fix or unfix the industrial robot 40 on site in the process of conveying the industrial robot 40, and thus the efficiency of conveying an industrial robot is improved.

Note that each module in an electromagnetic base 30 provided by an embodiment of the present invention may, according to an instruction sent by the control module 10, fix or unfix the industrial robot 40. For details about the process, refer to the preceding description of an embodiment of the method for conveying an industrial robot as shown in FIG. 6, and no similar description will be provided again.

Figure 12:
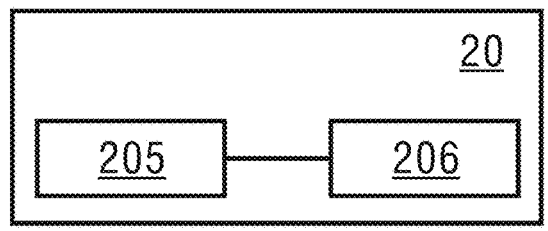
FIG. 12 is a schematic diagram for yet another automatic guided vehicle provided in an embodiment of the present invention.

As shown in FIG. 12, an embodiment of the present invention provides an automatic guided vehicle 20, comprising:
- a second instruction receiving module 205, configured to receive a second control instruction from the control module 10, and
- a conveying mechanism 206, configured to, according to the second control instruction received by the second instruction receiving module 205, convey, to a target position, an industrial robot 40 installed on an electromagnetic base 30 that has stopped attracting a metallic plate.

In an embodiment of the present invention, the second instruction receiving module 205 may be configured to perform Step 801 in the above-described embodiment of the method, and the conveying mechanism 206 may be configured to perform Step 802 in the above-described embodiment of the method.

With the automatic guided vehicle 20 provided by an embodiment of the present invention, the second instruction receiving module 205 is configured to receive a second control instruction from the control module 10, and the conveying mechanism 206 may, according to a second control instruction received from the second instruction receiving module 205, convey, to a target position, the electromagnetic base 30, which has stopped attracting the metallic plate, and the industrial robot 40 installed on the electromagnetic base 30; since the industrial robot 40 is moved automatically without on-site manual operations, the efficiency of conveying the industrial robot 40 is improved.

Note that each module in an automatic guided vehicle 20 provided by an embodiment of the present invention may, according to an instruction sent by the control module 10, convey the industrial robot 40. For details about the process, refer to the preceding description of an embodiment of the method for conveying an industrial robot as shown in FIG. 6, and no similar description will be provided again.

Figure 13:
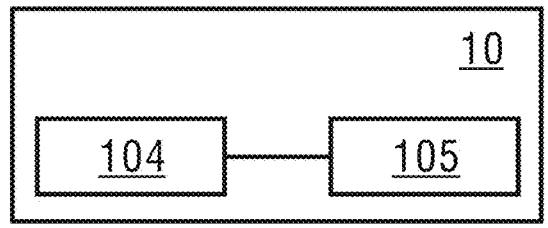
FIG. 13 is a schematic diagram for yet another control module provided in an embodiment of the present invention.

As shown in FIG. 13, an embodiment of the present invention provides a control module 10, comprising: at least one memory 104 and at least one processor 105, wherein
- the at least one memory 104 is configured to store a machine-readable program, and
- the at least one processor 105 is configured to call the machine-readable program stored in the at least one memory 104, for implementing the method for conveying an industrial robot provided in the embodiment shown in FIG. 6.

Figure 14:
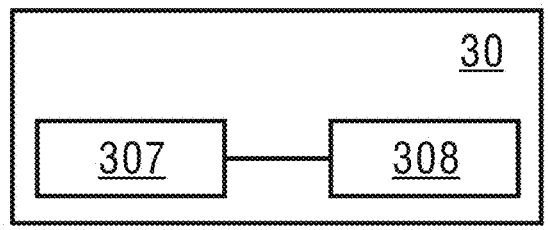
FIG. 14 is a schematic diagram for still another electromagnetic base provided in an embodiment of the present invention.

As shown in FIG. 14, an embodiment of the present invention provides an electromagnetic base 30, comprising: at least one memory 307 and at least one processor 308, wherein
- the at least one memory 307 is configured to store a machine-readable program, and
- the at least one processor 308 is configured to call the machine-readable program stored in the at least one memory 307, for implementing the method for conveying an industrial robot provided in the embodiment shown in FIG. 7.

Figure 15:
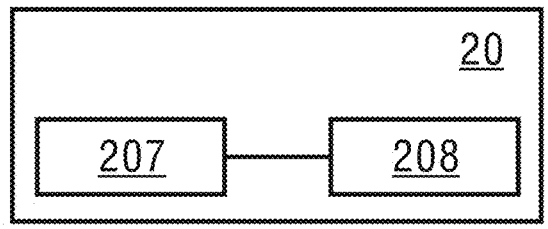
FIG. 15 is a schematic diagram for still another automatic guided vehicle provided in an embodiment of the present invention.

As shown in FIG. 15, an embodiment of the present invention provides an automatic guided vehicle 20, comprising: at least one memory 207 and at least one processor 208, wherein
- the at least one memory 207 is configured to store a machine-readable program, and
- the at least one processor 208 is configured to call the machine-readable program stored in the at least one memory 207, for implementing the method for conveying an industrial robot provided in the embodiment shown in FIG. 8.

Figure 16:
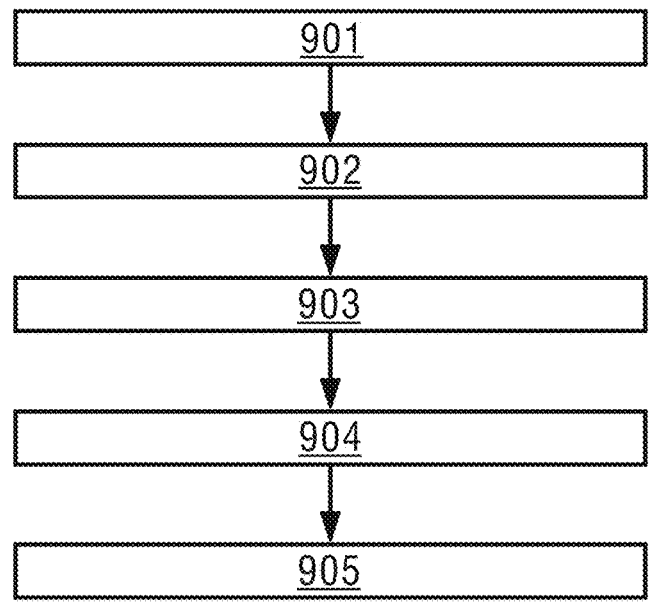
FIG. 16 is a flowchart for still another method for conveying an industrial robot provided in an embodiment of the present invention.

With reference to the system for conveying an industrial robot and the components of the system for conveying an industrial robot shown in FIGS. 1 to 5, a method for conveying an industrial robot provided by an embodiment of the present invention will be described in greater detail by taking as an example the controlling of the automatic guided vehicle 20 and the electromagnetic base 30 by the control module 10. As shown in FIG. 16, the method may comprise the following steps:

Step 901: The control module 10 receives a conveyance instruction to convey the industrial robot 40.

In an embodiment of the present invention, the control module 10 may receive a conveyance instruction from a user; according to a received conveyance instruction, the control module 10 may determine the industrial robot 40 to be conveyed and the target position to of the conveyance.

Step 902: The control module 10 sends a fourth control instruction to an automatic guided vehicle 20.

In an embodiment of the present invention, after determining, according to a conveyance instruction, the industrial robot 40 to be conveyed, the control module 10 determines the original position information about the industrial robot 40, generates a fourth control instruction that carries the original position information, and then sends the fourth control instruction to an idle automatic guided vehicle 20. The automatic guided vehicle 20 may, according to the original position information carried by the received fourth control instruction, move to the original position of the industrial robot 40 and grab the industrial robot 40, so that the industrial robot 40 remains in the current state and the industrial robot 40 is prevented from overturning. Specifically, after the automatic guided vehicle 20 moves to the original position of the industrial robot 40, the automatic guided vehicle 20 moves until the industrial robot 40 is located at the bottom of a U-shaped opening on the gripper connecting portion 2012, and then the grab mechanism 202 grabs the industrial robot 40.

Step 903: The control module 10 sends a first control instruction to the electromagnetic base 30 on which the industrial robot 40 is installed.

In an embodiment of the present invention, after determining, according to a conveyance instruction, the industrial robot 40 to be conveyed, the control module 10 determines the electromagnetic base 30 on which the industrial robot 40 is installed, and sends a first control instruction to the determined electromagnetic base 30, wherein the first control instruction instructs the electromagnetic base 30 to stop attracting a metallic plate fixed to the ground so that the industrial robot 40 installed on the electromagnetic base 30 is movable.

Step 904: The control module 10 sends a second control instruction to an automatic guided vehicle 20.

Figure 17:
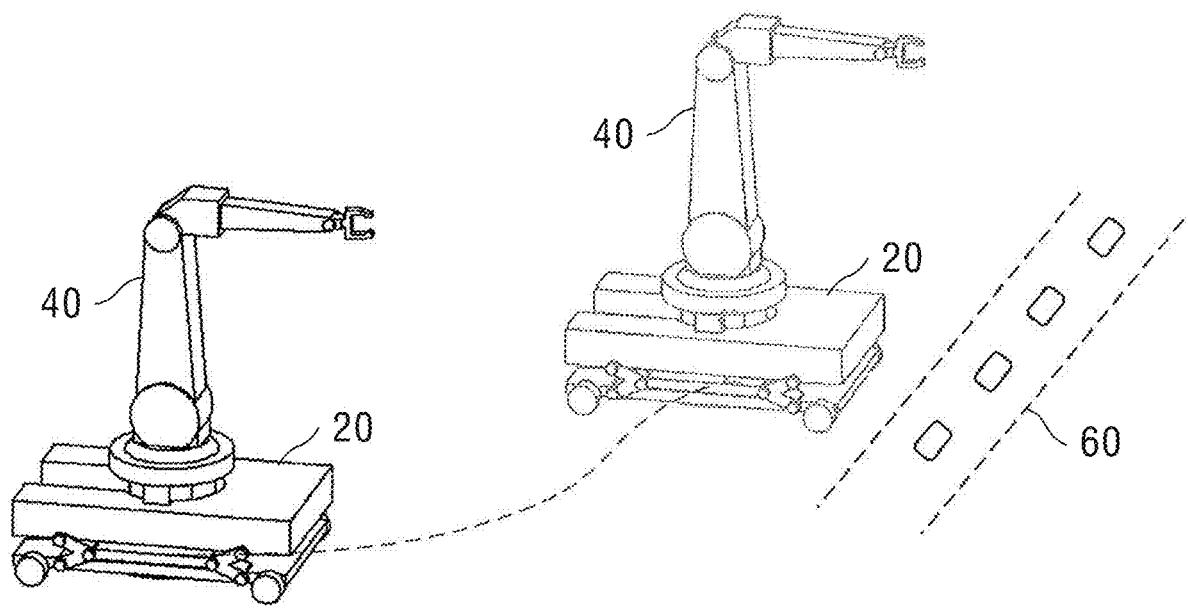
FIG. 17 is a schematic diagram for the process of conveying an industrial robot provided in an embodiment of the present invention.

In an embodiment of the present invention, after the electromagnetic base 30 on which the industrial robot 40 is installed stops attracting a metallic plate, the control module 10 sends a second control instruction to an automatic guided vehicle 20 configured to grab the industrial robot 40. After the automatic guided vehicle 20 receives the second control instruction, the automatic guided vehicle 20 lifts and then moves the industrial robot 40, thereby conveying the industrial robot 40 from the original position to the target position. Specifically, according to a second control instruction sent by the control module 10, the grab mechanism 202 grabs the industrial robot 40 and the lifting mechanism 203 lifts the industrial robot 40, allowing the industrial robot 40 and the electromagnetic base 30 that is fixedly connected to the industrial robot 40 to leave the ground. Then, the wheels 204 drive the vehicle frame 201 to move, thereby conveying the industrial robot 40 to the target position. FIG. 17 shows the process of the automatic guided vehicle 20 conveying the industrial robot 40 from the original position to the target position, in which the automatic guided vehicle 20 conveys the industrial robot 40 to the target position beside a new production line 60. Further, after the automatic guided vehicle 20 conveys the industrial robot 40 to the target position, the automatic guided vehicle 20 places the industrial robot 40 and the electromagnetic base 30 that is fixedly connected to the industrial robot 40 on a metallic plate fixed to the ground in the target position, and then the automatic guided vehicle 20 moves away from the target position.

Step 905: The control module 10 sends a third control instruction to the electromagnetic base 30.

In an embodiment of the present invention, after the automatic guided vehicle 20 places the industrial robot 40 and the electromagnetic base 30 that is fixedly connected to the industrial robot 40 on a metallic plate fixed to the ground in the target position, the control module 10 sends a third control instruction to the electromagnetic base 30 placed on the metallic plate fixed to the ground in the target position, so that the electromagnetic base 30 attracts the metallic plate fixed to the ground in the target position, thereby fixing the industrial robot 40.

Embodiments of the present invention further provide a machine-readable medium that stores an instruction for causing a machine to implement a method of any one of the above-described embodiments, for conveying an industrial robot described herein. Specifically, a system or device equipped with a storage medium may be provided, the storage medium storing software program code for implementing the functions of any one of the above-described embodiments, and a computer (for example, a CPU or an MPU) of the system or device is caused to read and execute the program code stored in the storage medium.

In such a case, program code read from the storage medium may by itself implement the functions of any one of the above-described embodiments, and therefore program code and a storage medium storing the program code constitute part of the present invention.

Examples of a storage medium for providing program code include floppy disk, hard disk, magneto-optical disk, optical disk (for example, CD-ROM, CD-R, CD-RW, DVD-ROM, DVD-RAM, DVD-RW, or DVD+RW), magnetic tape, non-volatile memory card, and ROM. Optionally, program code can be downloaded from a server computer via a communications network.

In addition, it should be made clear that functions of any one of the above-described embodiments may be implemented not only by executing program code read by a computer but also by causing, according to the instruction of program code, an operating system, etc. running on a computer to complete part or all of actual operations.

In addition, it can be understood that functions of any one of the above-described embodiments may be implemented by writing program code read from a storage medium to a memory disposed in an expansion board inserted into a computer or to a memory disposed in an expansion unit connected to a computer, and then by, according to the instruction of program code, causing a CPU, etc. installed on the expansion board or expansion unit to execute part of all of actual operations.

It should be noted that not all the steps or modules in the above-described flows and system structural diagrams are required, and certain steps or modules may be omitted as needed. The sequence of executing steps is not fixed and may be adjusted as needed. The system structures described in the above embodiments may be physical structures or logical structures; in other words, certain modules may be implemented as the same physical entity, or certain modules may be implemented as a plurality of physical entities separately, or certain modules may be jointly implemented by certain components in a plurality of standalone devices.

In each of the above embodiments, a hardware unit may be implemented mechanically or electrically. For example, a hardware unit may comprise a permanently dedicated circuit or logic, for example, a special processor, an FPGA, or an ASIC, for completing corresponding operations. A hardware unit may further comprise programmable logic or circuitry (for example, a general-purpose processor or any other programmable processor), which may be temporarily configured by software to perform corresponding operations. Specific implementations (mechanical, or dedicated permanent circuits, or temporarily configured circuits) can be determined on the basis of cost and time considerations.

While the present invention has been described and illustrated in detail above with reference to the drawings and preferred embodiments, the present invention is not limited to these disclosed embodiments, and more embodiments of the present invention can be obtained by combining the code auditing means in the different embodiments described above, as can be appreciated by those of ordinary skill in the art based on the above-mentioned embodiments; these embodiments also fall within the protection scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A robot conveying system, comprising:
   a control module;
   at least one automatic guided vehicle; and
   at least one electromagnetic base, wherein
   an industrial robot is installed on each at least one electromagnetic base, and wherein the at least one electromagnetic base may attract a metallic plate fixed to ground, thereby fixing the industrial robot installed on the at least one electromagnetic base;
   the control module is configured to send a first control instruction to the at least one electromagnetic base;
   the at least one electromagnetic base is configured to, according to the first control instruction received, stop attracting the metallic plate fixed to the ground so that the industrial robot installed on the at least one electromagnetic base is movable;
   the control module is further configured to send a second control instruction to the at least one automatic guided vehicle;
   the at least one automatic guided vehicle is configured to, according to the second control instruction received, convey, to a target position, the industrial robot installed on the at least one electromagnetic base that has stopped attracting the metallic plate;
   the control module is further configured to send a third control instruction to the at least one electromagnetic base; and
   the at least one electromagnetic base is further configured to, according to the third control instruction received, attract the metallic plate fixed to the ground in the target position, thereby fixing the industrial robot installed on the at least one electromagnetic base;
   wherein the at least one automatic guided vehicle includes
      a vehicle frame,
      a grab mechanism disposed on the vehicle frame,
      a lifting mechanism, and
      at least three wheels; and
   wherein
      the grab mechanism is configured to grab the industrial robot,
      the lifting mechanism is configured to, after the grab mechanism grabs the industrial robot, lift the industrial robot so that the industrial robot and the at least one electromagnetic base that is fixedly connected to the industrial robot leave the ground, and
      the at least three wheels are configured to, after the lifting mechanism lifts the industrial robot, drive the vehicle frame to move, thereby conveying the industrial robot to the target position.

2. The system of claim 1, wherein
   the control module is further configured to, before sending the first control instruction to the at least one electromagnetic base, send a fourth control instruction to the at least one automatic guided vehicle; and
   the at least one automatic guided vehicle is further configured to, based on the fourth control instruction received, grab the industrial robot.

3. The system of claim 1, wherein the at least one electromagnetic base comprises: a case, and a control panel and a magnetic suction cup disposed on the case, wherein
   the case is fixedly connected to the industrial robot;
   the control panel is configured to receive the first control instruction from the control module, generate a magnetism disabling instruction according to the first control instruction, receive the third control instruction from the control module, and generate a magnetism enabling instruction according to the third control instruction; and
   the magnetic suction cup is configured to, after the control panel generates the magnetism disabling instruction, stop generating electromagnetism for attracting the metallic plate, so that the industrial robot fixed on the case is movable, and, after the control panel generates the magnetism enabling instruction, start generating electromagnetism for attracting the metallic plate, thereby fixing the industrial robot that is fixedly connected to the case.

4. The system of claim 3, wherein the electromagnetic base further comprises: a power connector, wherein
   the power connector is disposed on the case;
   an output end of the power connector is connected to a power cable of the industrial robot fixed to the case; and
   upon the magnetic suction cup starting to generate electromagnetism for attracting the metallic plate, an input end of the power connector is connectable to a power interface disposed on the metallic plate, thereby connecting a power cable of the industrial robot.

5. The system of claim 1, wherein
   the vehicle frame comprises: a wheel connecting portion and a gripper connecting portion, wherein
   the lifting mechanism comprises: at least one linear driver and four lifting components;
   the at least three wheels are disposed on the wheel connecting portion, and the grab mechanism is disposed on the gripper connecting portion;
   the four lifting components are disposed on both sides of the gripper connecting portion, a respective pair of two lifting components, of the four lifting components, being disposed on each respective side of the both sides;
   each of the lifting components comprises a first connecting rod and a second connecting rod, a first end of the first connecting rod being connected to the wheel connecting portion by a pin roll, a first end of the second connecting rod being connected to the gripper connecting portion by a pin roll, a second end of the connecting rod being connected to a second end of the second connecting rod by a pin roll;
   the two lifting components on a respective same side of the gripper connecting portion are connected to both ends of the linear driver, one of the lifting components being connected to either end of the linear driver, respectively, wherein each end of the linear driver is connected to a second end of the first connecting rod and a second end of the second connecting rod by a pin roll, and the two lifting components connected to the linear driver are symmetrical with respect to a midpoint of an axial line of the linear driver; and
   the at least one linear driver is configured to, by expansion and contraction movements, drive changes in angle between the first connecting rod and the second connecting rod in the lifting components connected to the linear driver, so that the gripper connecting portion makes up-and-down movements relative to the wheel connecting portion.

6. The system of claim 5, wherein
   a U-shaped opening is disposed in a horizontal direction on the gripper connecting portion, and the grab mechanism is disposed at a bottom of the U-shaped opening; and after the industrial robot enters the U-shaped opening, the grab mechanism is configured to grab the industrial robot, so that synchronized movements of the industrial robot are performable with the gripper connecting portion.

7. The system of claim 1, wherein
the control module is further configured to generate a conveyance route based on the target position and generate the second control instruction that carries the conveyance route; and
the at least one automatic guided vehicle is configured to, according to the conveyance route carried by the second control instruction, convey the industrial robot to the target position.

8. An industrial robot conveying method, comprising:
sending a first control instruction to an electromagnetic base, the first control instruction being configured to instruct the electromagnetic base to stop attracting a metallic plate fixed to a ground so that the industrial robot installed on the electromagnetic base is movable;
sending a second control instruction to an automatic guided vehicle, the second control instruction being configured to instruct the automatic guided vehicle to convey, to a target position, the industrial robot installed on the electromagnetic base that has stopped attracting the metallic plate; and
sending a third control instruction to the electromagnetic base, the third control instruction being configured to instruct the electromagnetic base to attract a metallic plate fixed to the ground in the target position so that the industrial robot installed on the electromagnetic base is fixed,
wherein the automatic guided vehicle includes a vehicle frame, a grab mechanism disposed on the vehicle frame, a lifting mechanism, and at least three wheels, and wherein the second control instruction is configured to
instruct the grab mechanism to grab the industrial robot,
instruct the lifting mechanism to lift the industrial robot so that the industrial robot and the electromagnetic base that is fixedly connected to the industrial robot leave the ground, and
instruct the at least three wheels to drive the vehicle frame to move, thereby conveying the industrial robot to the target position.

9. The method of claim 8, further comprising, before sending the first control instruction to the electromagnetic base:
sending a fourth control instruction to the automatic guided vehicle, the fourth control instruction being configured to instruct the automatic guided vehicle to grab the industrial robot.

10. A control module, comprising:
at least one memory; and
at least one processor, the at least one memory being configured to store a machine-readable program, and the at least one processor being configured to call the machine-readable program to implement the method of claim 9.

11. The method of claim 8, wherein the vehicle frame includes a wheel connecting portion and a gripper connecting portion, and the lifting mechanism includes at least one linear driver and four lifting components, and wherein
the second control instruction is configured to instruct the at least one linear driver to make expansion and contraction movements, thereby driving changes in an angle between a first connecting rod and a second connecting rod in the four lifting components so that the gripper connecting portion makes up-and-down movements relative to the wheel connecting portion.

12. A control module, comprising:
at least one memory; and
at least one processor, the at least one memory being configured to store a machine-readable program, and the at least one processor being configured to call the machine-readable program to implement the method of claim 11.

13. The method of claim 8, further comprising, before sending a second control instruction to the automatic guided vehicle:
generating a conveyance route based on the target position, and
generating the second control instruction carrying the conveyance route, wherein
the second control instruction is configured to instruct the automatic guided vehicle to, according to the conveyance route carried by the second control instruction, convey the industrial robot to the target position.

14. A control module, comprising:
at least one memory; and
at least one processor, the at least one memory being configured to store a machine-readable program, and the at least one processor being configured to call the machine-readable program to implement the method of claim 13.

15. A control module, comprising:
at least one memory; and
at least one processor, the at least one memory being configured to store a machine-readable program, and the at least one processor being configured to call the machine-readable program to implement the method of claim 8.

* * * * *